(12) United States Patent
Cameron et al.

(10) Patent No.: US 9,495,673 B2
(45) Date of Patent: Nov. 15, 2016

(54) METHOD AND SYSTEM FOR A WIRELESS UNIVERSAL MOBILE PRODUCT INTERFACE

(71) Applicant: Accenture Global Services Limited, Dublin (IE)

(72) Inventors: Richard N. Cameron, Mouans Sartoux (FR); Loic J. Feinbier, Le Cannet (FR)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 13 days.

(21) Appl. No.: 14/526,263

(22) Filed: Oct. 28, 2014

(65) Prior Publication Data
US 2015/0052046 A1 Feb. 19, 2015

Related U.S. Application Data

(63) Continuation of application No. 09/840,477, filed on Apr. 23, 2001, now Pat. No. 8,903,737.

(60) Provisional application No. 60/199,488, filed on Apr. 25, 2000.

(51) Int. Cl.
*G06Q 30/00* (2012.01)
*G06Q 20/32* (2012.01)
(Continued)

(52) U.S. Cl.
CPC ............ *G06Q 20/325* (2013.01); *G06Q 20/04* (2013.01); *G06Q 20/06* (2013.01); *G06Q 20/10* (2013.01);
(Continued)

(58) Field of Classification Search
USPC .......................................................... 705/26
See application file for complete search history.

(56) References Cited

U.S. PATENT DOCUMENTS 2,501,067 A 3/1950 Lusebrink
5,201,067 A 4/1993 Grube et al.
(Continued)

FOREIGN PATENT DOCUMENTS

DE 19801 576 A1 7/1999
EP 08087655 4/1996
(Continued)

OTHER PUBLICATIONS

"ASAP to Enable E-Commerce Companies to Go WAP!" Business Wire, Mar. 2000, p. 1.
(Continued)

*Primary Examiner* — Garcia Ade
(74) *Attorney, Agent, or Firm* — Brinks Gilson & Lione

(57) ABSTRACT

The present invention provides a solution to the needs described above through a system and method for a wireless universal mobile product interface (WUMPI). Generally, products/objects have their own interface, or man-machine-interface (MMI). Technically, the wireless universal mobile product interface of the present invention (WUMPI) innovates this space by replacing the product's MMI by implementing reverse software control via wireless transmission channel and or Bluetooth wireless technologies to control the mobile device's screen—replacing the local software component on the mobile device which controls what is shown on the screen in terms of a man-machine interface (MMI). This enables a product/object within the area of the mobile device to take over control via the wireless transmission channel or other wireless capability of the mobile device and to "extend" the product interface to the mobile device that came within its control range, or the product/object's personal area network (PAN).

20 Claims, 21 Drawing Sheets

(51) Int. Cl.
*G06Q 20/04* (2012.01)
*G06Q 20/06* (2012.01)
*G06Q 20/16* (2012.01)
*G06Q 20/22* (2012.01)
*G06Q 20/36* (2012.01)
*G06Q 30/06* (2012.01)
*G07F 7/00* (2006.01)
*G07F 7/08* (2006.01)
*G07F 11/00* (2006.01)
*H04M 15/00* (2006.01)
*H04W 8/24* (2009.01)
*H04L 29/08* (2006.01)
*G07F 9/02* (2006.01)
*G06Q 20/10* (2012.01)
*G06Q 20/26* (2012.01)
*H04L 29/06* (2006.01)
*H04W 84/18* (2009.01)

(52) U.S. Cl.
CPC .............. *G06Q 20/16* (2013.01); *G06Q 20/26* (2013.01); *G06Q 20/29* (2013.01); *G06Q 20/32* (2013.01); *G06Q 20/322* (2013.01); *G06Q 20/327* (2013.01); *G06Q 20/3224* (2013.01); *G06Q 20/3226* (2013.01); *G06Q 20/3229* (2013.01); *G06Q 20/363* (2013.01); *G06Q 30/0641* (2013.01); *G07F 7/00* (2013.01); *G07F 7/005* (2013.01); *G07F 7/0866* (2013.01); *G07F 9/023* (2013.01); *G07F 11/002* (2013.01); *H04L 63/0853* (2013.01); *H04L 67/04* (2013.01); *H04L 69/329* (2013.01); *H04M 15/68* (2013.01); *H04W 8/245* (2013.01); *H04L 63/08* (2013.01); *H04L 63/0869* (2013.01); *H04L 63/166* (2013.01); *H04L 2463/102* (2013.01); *H04M 2215/0196* (2013.01); *H04M 2215/32* (2013.01); *H04W 84/18* (2013.01)

(56) References Cited

U.S. PATENT DOCUMENTS

| | | | |
|---|---|---|---|
| 5,857,147 A * | 1/1999 | Gardner et al. | 455/67.11 |
| 5,896,411 A * | 4/1999 | Ali | H04W 52/362 375/130 |
| 5,898,919 A | 4/1999 | Yuen | |
| 5,914,950 A * | 6/1999 | Tiedemann et al. | 370/348 |
| 6,021,399 A | 2/2000 | Demers et al. | |
| 6,038,491 A | 3/2000 | McGarry et al. | |
| 6,167,253 A | 12/2000 | Farris et al. | |
| 6,185,198 B1 | 2/2001 | LaDue | |
| 6,195,541 B1 | 2/2001 | Griffith | |
| 6,295,448 B1 | 9/2001 | Hayes et al. | |
| 6,430,407 B1 | 8/2002 | Turtiainen | |
| 6,490,443 B1 * | 12/2002 | Freeny, Jr. | 455/406 |
| 6,535,726 B1 | 3/2003 | Johnson | |
| 6,584,321 B1 | 6/2003 | Coan et al. | |
| 6,658,248 B1 * | 12/2003 | Lee | 340/5.9 |
| 6,681,110 B1 | 1/2004 | Crookham et al. | |
| 6,784,872 B1 | 8/2004 | Matsui et al. | |
| 6,909,876 B2 | 6/2005 | Higashino et al. | |
| 7,896,975 B2 * | 3/2011 | Chung | A47L 15/4204 134/109 |
| 2001/0005840 A1 | 6/2001 | Verkama | |
| 2002/0175207 A1 | 11/2002 | Kashef et al. | |
| 2002/0178062 A1 * | 11/2002 | Wright et al. | 705/17 |
| 2003/0149662 A1 * | 8/2003 | Shore | G06Q 20/04 705/39 |

FOREIGN PATENT DOCUMENTS

| | | |
|---|---|---|
| EP | 1146490 A2 | 10/2001 |
| WO | WO 99/22346 | 5/1999 |
| WO | WO 00/38443 | 6/2000 |
| WO | WO 01/20844 A1 | 3/2001 |
| WO | WO 01/41408 A1 | 6/2001 |

OTHER PUBLICATIONS

K. Hefner, "Want a soda? Phone it in mobile commerce could turn your wireless phone into an electronic wallet for all kinds of purchases", The New York Times, Mar. 12, 2000, 5 pgs.

J. du Pre Gauntt, "Electric Commerce on the Move", Proceeding of the 3$^{rd}$ USENIX Workshop on Electronic Commerce, Boston, Ma., Aug. 31, 1998, 11 pages.

Press release, "Bluetooth Technology Set to Re-Define the Personal Communication Market", Phillips Business Information Communications Standards News; Potomac; Dec. 20, 1999, 2 pages, extracted from Internet from: proquest.search.com.

K. Kaowthumrong et al., "Automated Selection of the Active Device in Interactive Multi-Device Smart Spaces", Accepted for publication at the Spontaneity Workshop of Ubicomp 2002, 6 pages.

International Search Report in PCT/EP 01/04628 mailed Jun. 21, 2002, 7 pages.

* cited by examiner

Consumer-Centric Model

ISP Centric Model

Bank-Centric Model

Qpass Business Model

Selecting an infrared device

Selecting a COM port to attach to

Selecting the virtual COM port

Deselecting unneeded components

JDK 1.3 required options

Select No, when prompted to reboot

Microsoft Infrared Driver Set-up

FIG. 21

```
Command Prompt

Mobile Service Link - <c> Copyright 2001 accenture. parts Qpass Inc.
Usage :
  Java MobileServiceLink <Parameter(s)> [ <Switch(es)> ]

Parameters :
  <I-COM> - (virtual) infrared COM port provided by IrDA driver
  <V-COM> - vending machine COM port (if machine attached)

Switches :
  <-offline>      - runs Mobile Service Link without live transaction processing
  <-controller>   - runs Mobile Service Link as hardware controller without screen output
  <-simulation>   - runs Mobile Service Link simulation without phone interaction
  <-memberid:>    - overrides the Qpass membership ID with the one specified
  <-password:>    - overrides the Qpass password with the one specified Examples :
  Java MobileServiceLink COM2 COM3    - IrDA : COM2, vending machine: COM3
  Java MobileServiceLink COM2 -offline - IrDA : COM2, no transactions Valid (as reported by operating system) :
  COM1 COM2 COM3
```

METHOD AND SYSTEM FOR A WIRELESS UNIVERSAL MOBILE PRODUCT INTERFACE

CROSS-REFERENCE TO RELATED APPLICATIONS

This application is a continuation of U.S. application Ser. No. 09/840,477, filed Apr. 23, 2001, which claims the benefit of U.S. Provisional Application No. 60/199,488, filed Apr. 25, 2000, each of which is incorporated in its entirety herein.

COPYRIGHT NOTICE

A portion of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to the field of wireless communications systems. More particularly, the present invention relates to the field of systems for enabling mobile electronic commerce including systems connecting product devices, micropayment systems and mobile devices, and specifically to a method and system for allowing a product or similar object to capture the services of a wireless mobile device within the wireless reach area of the product/object.

BACKGROUND

A technical problem presently exists in the area of reverse-use for mobile phones and mobile devices as they are currently used. Today, products/objects have their own interface or man-machine-interface (MMI). For example, a soft drink or other type vending machine today has an MMI wherein the machine displays its wares, prices, provides input devices for a person to input the required payments in order to obtain a desired product. If one has no change or bills on hand of the proper type the purchase cannot be made from the machine.

It is desirable to pay for the machines' offerings using one's mobile phone. It is further desirable that the vending machines' offerings and the price information for the purchase would appear on one's mobile phone's display, so that all one had to do would be to type in his/her secret PIN code to authenticate a transaction to purchase an item. The vending device would accept a signal to dispense the desired item and a central payment provider would record the transaction, provide the necessary signal to the machine to provide the product and submit a bill to the mobile phone user at month end.

With the emerging popularity of the Internet as a purchasing tool, the demand for handling electronic payments in a secure and easy way has grown enormously. Credit cards and online account verification may yet well suit the handling of medium-priced and expensive goods, but are not economic enough for use with very low value purchases. This is why over the last few years a variety of solutions for these so-called micropayments have appeared to handle amounts as low as the fraction of a cent. However, there is a technical problem at present in the development of effective, concrete and efficient systems which integrate micropayment systems with product devices and related mobile personal devices.

Cellphones or mobile phones as they are also called (hereinafter "mobile device") have become ubiquitous, and initiatives such as Bluetooth™ are underway to embed tiny, inexpensive, short-range transceivers into the mobile devices that are available today, either directly or through an adapter device such as a PC Card. The radio operates on the globally-available unlicensed radio band, 2.45 GHz, and supports data speeds of up to 721 Kbps, as well as three voice channels. Bluetooth-enabled devices and adapters began to appear in 2000.

"Bluetooth" is a word used to refer to a technology, or to the Special Interest Group (SIG) formed in early 1998 by a group of computer and telecommunications industry leaders, including Intel™, IBM,™ Toshiba™, Ericsson™, and Nokia™. These companies together began developing a way for users to connect a wide range of mobile devices quickly and easily, without cables. To ensure that this technology is seamlessly implemented in a diverse range of devices, these leaders formed a special interest group to design a royalty free, open specification technology, code named "Bluetooth." The SIG has quickly gained membership from companies such as 3COM/Palm™, Axis Communication™, Compaq™, Dell™, Lucent Technologies UK Limited™, Motorola™, Qualcomm™, Xircom™ and is encouraging the involvement of all other companies interested in offering products taking advantage of a standardized, wireless means for connection. The specification for the Bluetooth technology is available on the SIG website at www.bluetooth.com and is hereby fully incorporated herein by reference.

The Bluetooth wireless technology is designed to revolutionize the personal connectivity market by providing freedom from wired connections. It is a specification for a small-form factor, low-cost radio solution providing links between mobile computers, mobile phones and other portable handheld devices, and connectivity to the internet. For example, at home, a phone functions as a portable phone (fixed line charge). When one is on the move, it functions as a mobile phone (cellular charge). And when the phone comes within range of another mobile phone with built-in Bluetooth wireless technology it functions as a walkie talkie (no telephony charge). It is envisioned that one can use their mobile computer to surf the Internet wherever they are, and have automatic synchronization of one's desktop, mobile computer, notebook (PC-PDA and PC-HPC) and the mobile phone. Early revisions of the specification has been released to members of the Bluetooth SIG. Version 1.0 was published Q2 1999. Version 2.0 are scheduled to be released in year 2001.

Additional efforts are underway to connect all types of devices to computer systems, and to make these devices callable by other systems users anywhere on the network. For example, Sun Microsystems JAVA™ and JINI™ technologies are aimed at embedding microprocessors in various devices which can, when connected to a network, provide information about the devices characteristics, how to communicate with it, etc. Bluetooth is a network transport protocol that could be used to allow attendee viewing devices to be connected to a JINI compatible system without being physically connected. JINI is described in more detail in the document titled "Jini™ Device Architecture Specification" which can be found at the Sun Microsystems web site www.sun.com/jini/whitepapers/ and which is incorporated fully herein by reference.

Alternative embodiments can include other plug-and-participate devices such as those provided by other network technologies complimentary to Bluetooth and JINI, such as Hewlett Packard's™ JetSend™ technology which is another example of a service protocol that allows devices to intelligently negotiate information exchange.

Other technologies like Motorola's™ Piano, which can be built on top of Bluetooth, specifies what sort of information they exchange and how they communicate. It and other operating systems, like Symbian Ltd.s™ Epoc32 for mobile devices, can support Bluetooth and JINI technology.

While these and other similar technologies will provide the embedded means for various products and services devices to be enabled to communicate, wirelessly and otherwise, there are no present mechanisms for using the technologies to extend the products MMI from the device itself to unknown nearby wireless devices automatically.

These is a need in the art for a system and method for a product device or service operation to extend its man-machine-interface to such nearby unknown communications devices in order to simplify the means of transacting exchanges of goods and services in an extended arena. Similarly, a practical, concrete and useful system for handling micropayments using such wireless mechanisms is needed.

SUMMARY

The present invention provides a solution to the needs described above through a system and method for a wireless universal mobile product interface (WUMPI). Today, products/objects have their own interface, or man-machine-interface (MMI). Technically, the wireless universal mobile product interface of the present invention (WUMPI) innovates this space by replacing the product's MMI by implementing reverse software control via infrared and or Bluetooth or other wireless technologies (such as wireless LAN=IEEE 802.11b) to control the mobile device's screen-replacing the local software component on the mobile device which controls what is shown on the screen in terms of a man-machine interface (MMI). This enables a product/object within the area of the mobile device to take over control via the infrared or other wireless capability of the mobile device and to "extend" the product interface to the mobile device that came within its control range, or the product/object's personal area network (PAN). The infrared and or Bluetooth or other wireless technologies (such as wireless LAN=IEEE 802.11 b) mentioned above will generally be referred to below as the "wireless transmission channel."

A system is disclosed for providing reverse-control of a wireless mobile device in order to perform functions using the wireless mobile device for which it was not originally designed. A mechanism is disclosed for using a protocol to communicate via a wireless transmission channel port on a personal computer (PC) to the wireless transmission channel port of a mobile phone to take control of the mobile phone's menuing, interaction, display and other MMI capabilities to create an extended interactive product interface.

A method is disclosed for using a protocol to communicate via an wireless transmission channel port on a personal computer (PC) to the wireless transmission channel port of a mobile phone to take control of the mobile phone's menuing, interaction, display and other MMI capabilities to create an extended interactive product interface.

Similarly, a computer program stored on a computer readable medium or carrier wave is disclosed having computer code mechanisms for using a protocol to communicate via an wireless transmission channel port on a personal computer (PC) to the wireless transmission channel port of a mobile phone to take control of the mobile phone's menuing, interaction, display and other MMI capabilities to create an extended interactive product interface.

Additionally a system is disclosed for electronically connecting a user via a mobile device to a product device and to a micropayment system.

Still other embodiments of the present invention will become apparent to those skilled in the art from the following detailed description, wherein is shown and described only the embodiments of the invention by way of illustration of the best modes contemplated for carrying out the invention. As will be realized, the invention is capable of modification in various obvious aspects, all without departing from the spirit and scope of the present invention. Accordingly, the drawings and detailed description are to be regarded as illustrative in nature and not restrictive.

BRIEF DESCRIPTION OF THE DRAWINGS

The features and advantages of the system and method of the present invention will be apparent from the following description in which:

FIG. 12 illustrates an example of a diagram of a screenshot of selecting a COM port to attach to.

FIG. 20 illustrates an example of a diagram of a screenshot for Qpass sign-in.

FIG. 21 illustrates an example of a diagram of a simplified interface.

DETAILED DESCRIPTION

The present invention provides a solution to the needs described above through a system and method for a wireless universal mobile product interface (WUMPI). Today, products/objects have their own interface, or man-machine-interface (MMI). Technically, the wireless universal mobile product interface of the present invention (WUMPI) innovates this space by replacing the product's MMI by implementing reverse software control via wireless transmission channel and or Bluetooth wireless technologies to control the mobile device's screen-replacing the local software component on the mobile device which controls what is shown on the screen in terms of a man-machine-interface (MMI). This enables a product/object within the area of the mobile device to take over control via the wireless transmission channel or other wireless capability of the mobile device and to "extend" the product interface to the mobile device that came within its control range, or the product/object's personal area network (PAN)

Other innovations in this space are product specific, and typically proprietary to that product of vendor or object, and must come with the product or be bought separately—often with the control logic for the MMI built into the control device (i.e. such as a remote control device for a stereo or TV). WUMPI's key feature of reverse-controlling the wireless mobile device and "collaborating" with the wireless mobile device's MMI capabilities as described above extend the product interface to any mobile device within the product/objects "personal area network" (PAN) and is unique to our knowledge today.

Operating Environment

The environment in which the present invention is used encompasses the general computing and telecommunications environments, including wireless communications. A variant of the system operates on SMS over GSM in European environments and a second variant would operate over the Internet as the globally available communication medium.

Figure 1:
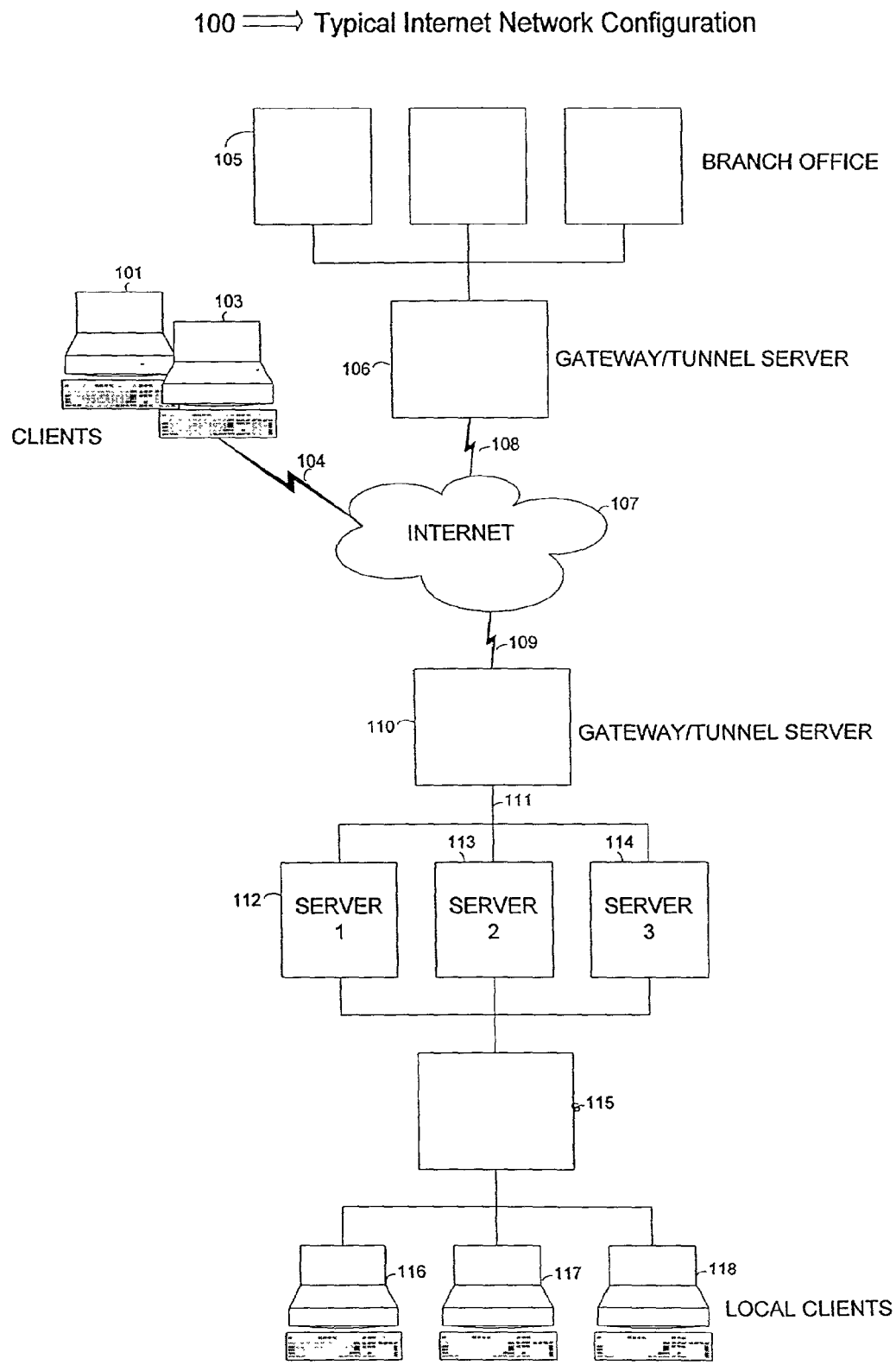
FIG. 1 illustrates an exemplary Internet distributed system configuration.

Some of the elements of a typical Internet network configuration are shown in FIG. 1, wherein a number of client machines 105 possibly in a branch office of an enterprise, are shown connected to a Gateway/hub/tunnel-server/etc. 106 which is itself connected to the internet 107 via some internet service provider (ISP) connection 108. Also shown are other possible clients 101, 103 similarly connected to the internet 107 via an ISP connection 104, with these units communicating to possibly a home office via an ISP connection 109 to a gateway/tunnel-server 110 which is connected 111 to various enterprise application servers 112, 113, 114 which could be connected through another hub/router 115 to various local clients 116,117,118. Any of these servers 112, 113, 114 could function as a server controlling the communications and functions between a mobile device, a vendor/device, a payment function and a billing function of the present invention, as more fully described below. Any of these client machines could be a mobile device which has been captured by the present invention and could communicate wirelessly to another network device as required. In the preferred embodiment, as described more fully below, a message can be sent to a special email address or server for a receiver which is not known to the mobile device user.

Figure 2:
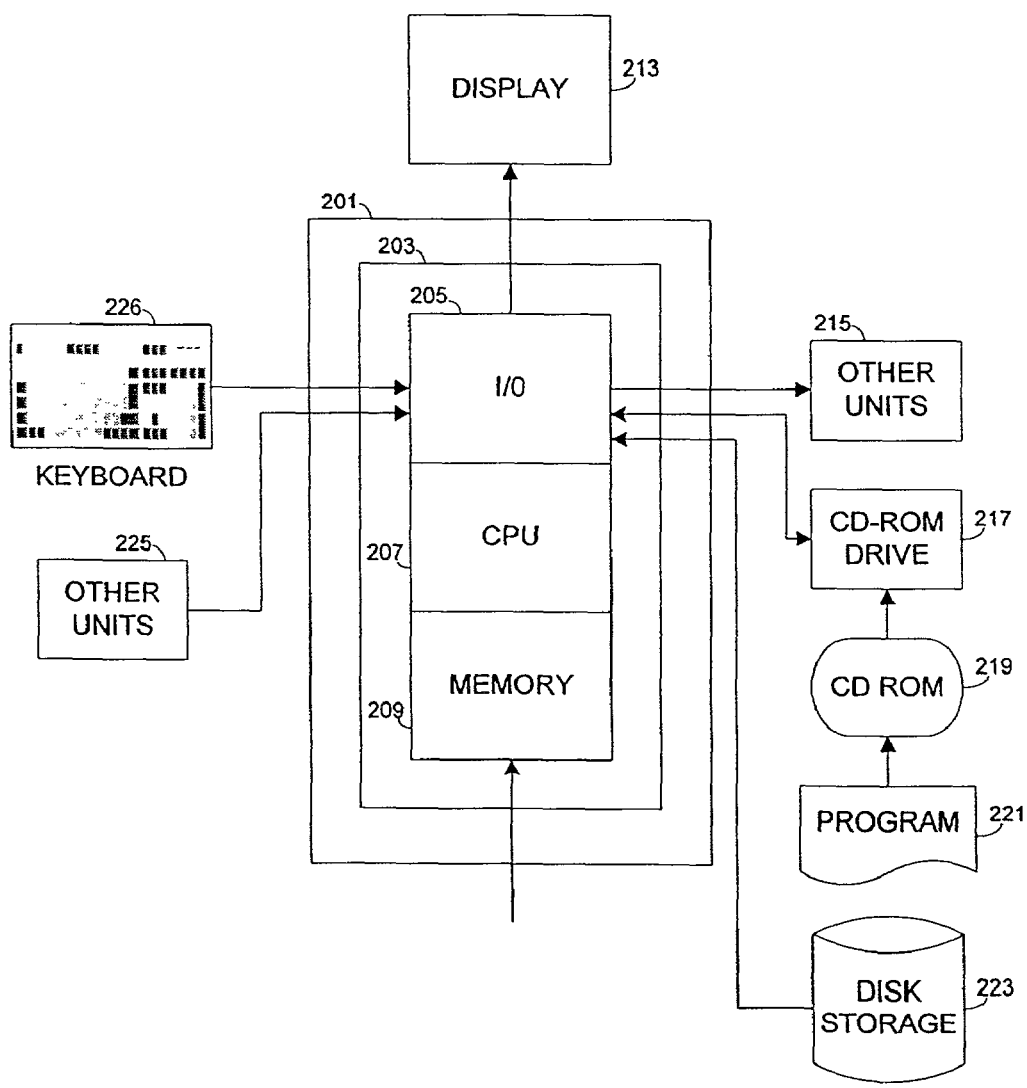
FIG. 2 illustrates a representative general purpose computer configuration.

An embodiment of the WUMPI System of the present invention can operate on a general purpose computer unit which may comprise some or all of the elements shown in FIG. 2 in the form of a laptop computer. The general purpose system 201 includes a motherboard 203 having thereon an input/output ("I/O") section 205, one or more central processing units ("CPU") 207, and a memory section 209 which may have a flash memory card 211 related to it. The I/O section 205 is connected to a keyboard 226, other similar general purpose computer units 225, 215 which can include an wireless transmission channel (IR) port, a disk storage unit 223 and a CD-ROM drive unit 217. The CD-ROM drive unit 217 can read a CD-ROM medium 219 which typically contains programs 221 and other data. Logic circuits or other components of these programmed computers will perform series of specifically identified operations dictated by computer programs as described more fully below.

The Mobile Service Link system of the preferred embodiment uses a vending machine equipped with an RS232 interface to connect to a PC. A laptop with wireless transmission channel adapter runs custom-written software to simulate a virtual vending machine and sends commands to the real physical one. It transmits transactions to a Qpass™ Engine hosted at the vendor's service centre. A mobile phone with wireless transmission channel modem becomes the user interface for the vending machine Using technology 'from Ericsson™, it receives and interprets the commands and displays a list of available beverages that the consumer can chose from. In this preferred embodiment, the consumer's mobile phone becomes the user interface for the vending machine, by displaying the list of available drinks from which to select. A wireless transmission channel is used to enable direct communication of the mobile terminal with other objects like the vending machine. Thereby mobile telecom operator's networks are completely bypassed, reducing transaction costs and increasing speed. On the back end the of the preferred embodiment a connection is made to the Qpass existing micropayment solution to handle payment and billing. The best mode as currently known is described in more detail below.

Additional Technical Background

The following additional background information on wireless and mobile positioning technologies such as SIM Toolkit, Bluetooth, WAP and GSM positioning is provided to aid in understanding the present invention which is used to combine in a unique and concrete and useful manner a micropayment system with a product device and a mobile wireless device, as well as to take control of a nearby wireless device such as a cellphone.

Enabling technologies for mobile commerce encompass any kind of wireless technology from a handheld device, even including a supporting network.

However, communication infrastructure is not the only driver to make mCommerce work. A very important conceptual detail lies in the creation of secure, fast and easy-to-use payment mechanisms. Although there are many existing concepts, most of these are limited to purchases via the Internet, or are restricted to purchases of digital goods only.

The preferred embodiment of the present invention will be better appreciated with an understanding of how these concepts could be applied to mobile commerce and physical goods purchases. An understanding of given micropayment solutions is critical to achieve this. There are at present as many as 20 major players in this field.

Technological Trends

Some technologies such as the SIM Application Toolkit, smartcards and dual-slot phones have been known for a number of years. Other technologies such as the Wireless Application Protocol (WAP) or Bluetooth or Wireless LAN, etc. are emerging at a remarkable speed.

These are all technologies that enable the creation of applications to access value-added services and to conduct purchases from wireless devices. From an infrastructure perspective (handsets, networks); however, development is faster than ever.

Mobile phones are turned into Internet devices through the integration of WAP browsers. Personal Digital Assistants (PDAs) are going even further: where one previously needed an additional mobile phone to connect to the Internet, these PDAs now start to have this capability integrated into one device. Mobile phones, PDAs and other similar hand held devices are generally referred to hereafter as "mobile devices."

last few years, making smartcards a cheap throwaway article. At the same time, they have evolved from being a dumb, low-capacity storage medium to intelligent devices with up to 2 Mb of memory and support for popular programming platforms such as Windows" and Java™.

Micropayments

Credit cards and online account verification may yet well suit the handling of medium-priced and expensive goods for Internet purchases, but are not economic for use with very low value purchases. This is why over the last few years a variety of solutions for these so-called micropayments have appeared.

Digital goods such as music, videos, information services, news, electronic books, online games and adult content can now be sold in a profitable way. The same applies for

| Evolution to 3$^{rd}$ Generation Wireless Networks |
|---|
| Global System for Mobile Communication (GSM) |
| GSM technology aperases in 900 MHz, 1800 MHz and 1900 MHz (US-specific) frequency bands and is the mass common mobile standard in Europe and most of the Asia-Pacific region. This technology is used by more than 50% of the world's mobile phone subscribers.<br>High Speed Circuit Switched Data (HSCSD) |
| HSCSD is a circuit-switched protocol based on GSM technology. It enables the transmission of data at up to four times the speed of the theoretical wireless transmission rate of 14.4 Kbit/s by using four radio channels simultaneously. A key limitation of this technology is a call set-up time of around 40 seconds<br>General Packet Radio Service (GPRS) |
| GPRS is a packet-switched wireless protocol that offers instant access to data networks. Theoretically, it will permit transmission speeds of up to 471 Kbit/s. GPRS provides an "always on" connection between the mobile terminal and the network by at the same time optimising the use of network capacity.<br>Enhanced Data Rates for Global Evolution (EDGE) |
| EDGE is a higher bandwidth version of GPRS. EDGE will allow transmission speeds of up to 384 Kbit/s; which will make it possible to run mobile multimedia applications. It is an intermediary stage in the migration than GPRS to UMTS; as EDGE requires the modulation changes that will eventually be used by UMTS.<br>Universal Mobile Telephone System (UMTS) |
| UMTS is a mobile phone system that will enable transmission speeds of up to 2 Mbit/s togehter with inherent IP support. This so-called 3$^{rd}$ Generation network standard will be able to process data 207 times faster than current GSM connections. The standard with finally enable high-quality extended mobile data applications, and with increased competition and improved technology, price points will come down. |

Evolution to 3$^{rd}$ Generation Wireless Networks (Source; Lehman Brothers)

With the evolution of wireless networks into the so-called 3rd Generation Networks, it is expected that the limiting transmission speeds will soon disappear and open the way for wireless access to any multimedia source imaginable.

Moreover, wireless connections to the Internet or Intranet will be permanent, with no need to dial up. Communications will work, and more importantly, be charged, per packet (starting with GPRS), thereby enabling completely new services at prices based on real usage.

Smartcard technology as a means to conduct safe commerce is maturing. Prices have fallen significantly within the pay-per-use services, online product support or even access to a web site itself. Similar concepts existed with French Minitel™ and German BTX™ online services.

In the meantime, systems exist that claim to handle amounts as low as the fraction of a cent. However, these models are not yet shown to be realistic.

Micropayment Strategies

Before we go into further detail about micropayment models, it is useful to have a general view of existing digital money schemes.

| Digital Money Schemes | | | | |
|---|---|---|---|---|
| Model | Anonymity | Economy | Peer2Peer | Security |
| Transactional - A network, such as the Internet, is used to create a debit or credit to a traditional deposit account or credit card. In these schemes, no new money is created. The physical equivalent would be a check or credit card charge slip. | ✓ | | | |
| Token New money is created and held in the form of electronic entities (often called coins or tokens). Each | ✓ | ✓ | | ✓ |

| Digital Money Schemes | | | | |
|---|---|---|---|---|
| Model | Anonymity | Economy | Peer2Peer | Security |
| entity has a specific value. When purchased, a unique identification number is issued as part of the entity. When turned in, this identification number is checked centrally in order to provent entities from being reused. The entities may be stored on a local PC or on smartcards. The physical equivalent to this model is cash and Eurocheques or Travellers Checks. | | | | |
| Nominal - New money is created and stored in an electronic (bank) account, which may be decreased as payments are made. The account can be "recharged" by transferring money from traditional accounts. The physical equivalent to this model is a chequebook. | ✓ | ✓ | ✓ | ✓ |

Among the different micropayment solutions available on the market today, most can be reduced to a very basic set of different concepts. In general up to four different parties are involved in a micropayment transaction:

The consumer or buyer of digital and/or physical goods.

The vendor, either a content provider (if selling digital goods) or a merchant (if selling physical goods), or a combination of both.

The payment provider, either the technology provider and/or a bank, a credit card organisation or system of those financial institutions, an ISP or a telecommunications company, providing and/or hosting the micropayment solution. (The terms payment provider and bank will be used as equivalents and may comprise a whole system of financial institutions that is not further detailed.)

Possible combinations of these players can be examined as a source of revenue, resulting in three different models:

Consumer Centric Model

Figure 3:
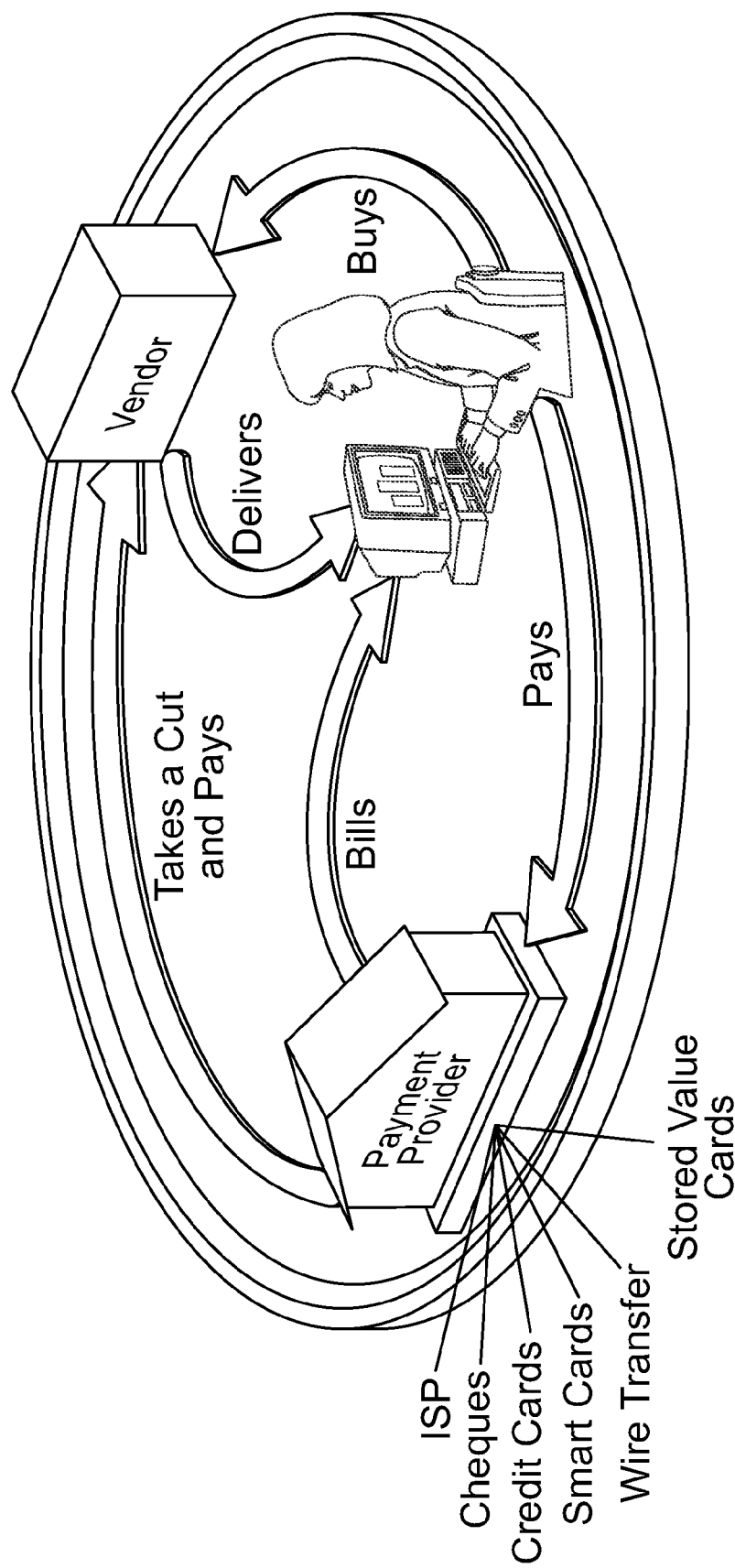
FIG. 3 illustrates an example of a schematic diagram of a consumer centric model.

FIG. 3 is an example of a schematic diagram of a consumer centric model. In the consumer centric model, the payment provider derives a significant portion of its revenues from the end-consumer. In addition the payment provider usually outsources the billing process on behalf of the vendor, from which additional royalties are claimed for this service. Major players in this model are Magex™, BiBit™ and Millicent™

ISP-Centric Model

Figure 4:
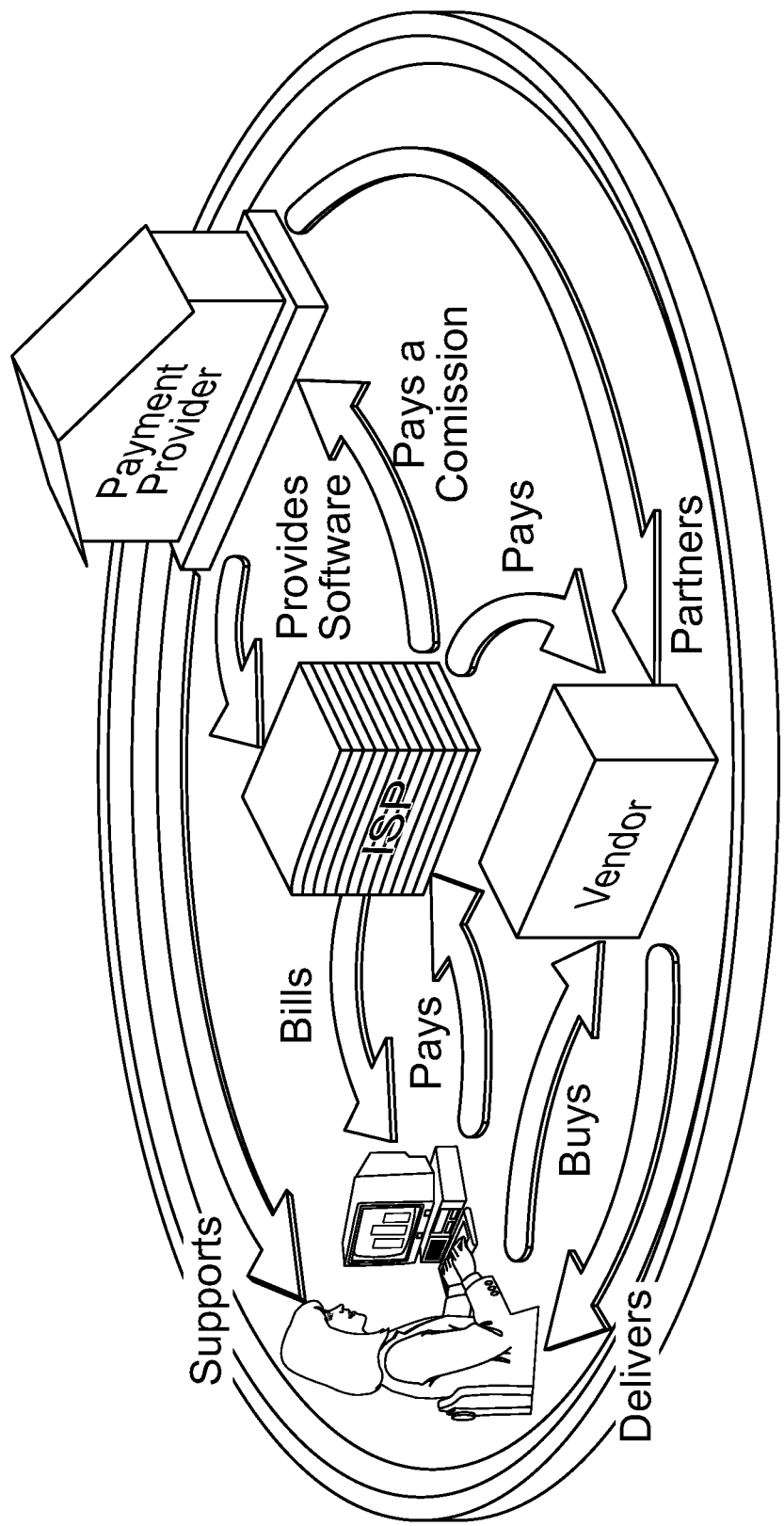
FIG. 4 illustrates an example of a schematic diagram of an ISP-centric model.

FIG. 4 is an example of a schematic diagram of an ISP-centric model. The ISP-centric model leverages existing investments in billing systems and Internet infrastructures (for consumer authentication). It thereby generates new revenue sources for ISPs. Usually, payment providers either sell the necessary technology to the ISPs and/or receive royalties from them. Players in this field include iPIN™, Clickshare™, NetToll™ and NTSys™.

Bank Centric Model

Figure 5:
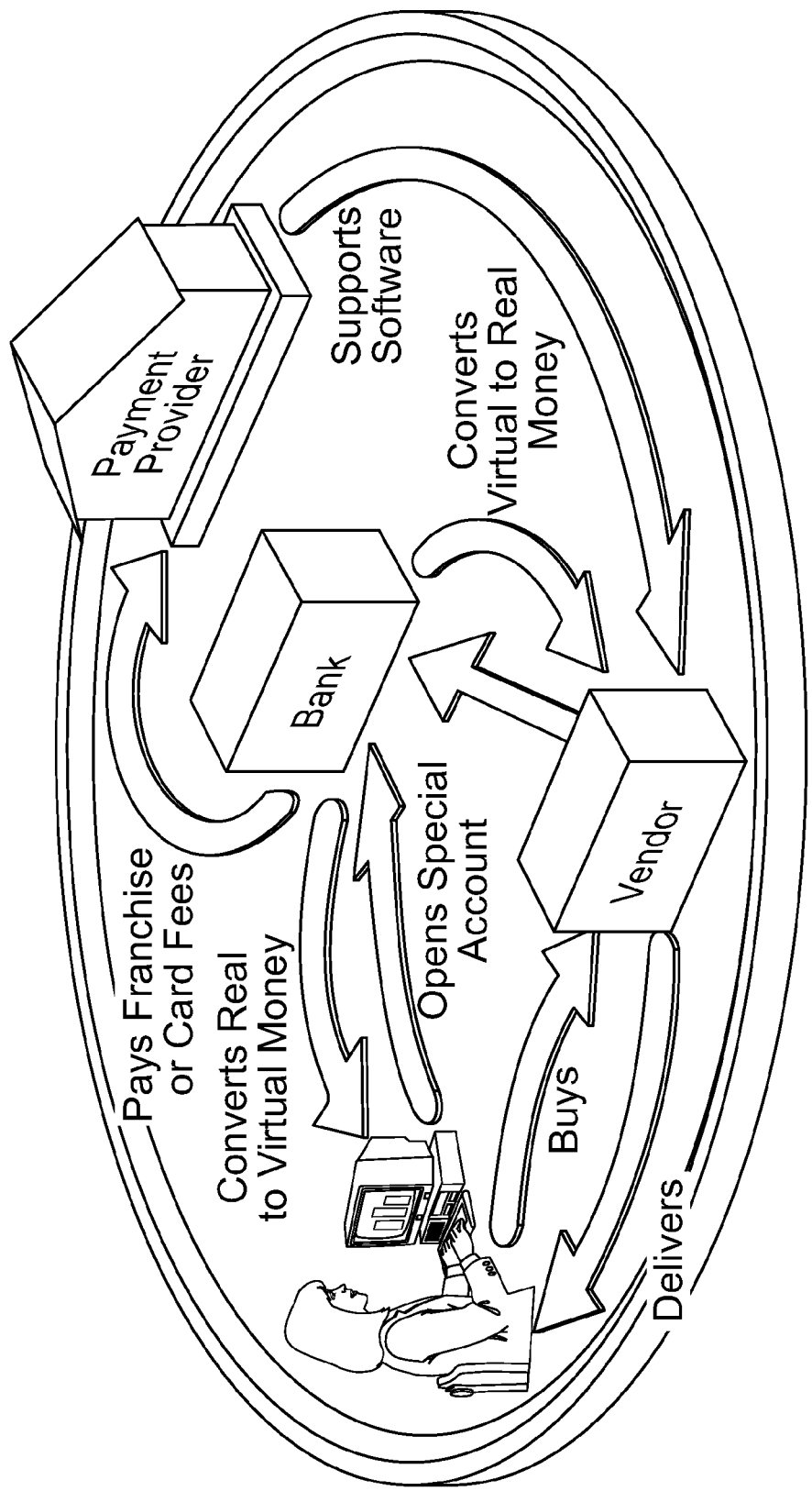
FIG. 5 illustrates an example of a schematic diagram of a bank centric model.

FIG. 5 is an example of a schematic diagram of a bank centric model. Within the bank-centric model, technology is franchised by financial institutions from the payment providers. The latter usually receive franchising and transaction fees. Good reputation and trust in those financial institutions, as well as an existing security infrastructure are critical advantages of this model. The dominant player in this field is Mondex™.

All micropayment solutions can be reduced to essentially two different paradigms:

"The Deferred Aggregator"

The "deferred aggregator" summarises all those micropayment solutions where small purchases are summed up until the end of a cycle ("deferred") and then billed to the consumer's account or credit card. In most cases, vendors would receive payment at the end of the agreed cycle directly by the mediating party.

Sometimes consumer bank accounts would be debited immediately, but vendors would still be paid with a delay, giving the mediating party the opportunity to take an additional cut (apart from transaction fees) by using this money.

Among the players using this dominant micropayment model are Clickshare™, ECharge™, Ehpt™, InterCoin™, IPIN™, KLELine™, Magex™, IBM™, NetChex™, NetToll™, Qpass™ and TrivNet™.

Prepaid Digital Cash

This model is relevant for several different types of accounts, from simple, prepaid consumer accounts, held at the payment provider, to virtual bank accounts with electronic money, hosted by a bank or other trusted financial institution. When a purchase is made, the price is deducted real-time from the consumer's digital account. Payment providers make their money through transaction fees and by using any temporary monetary "overcapacities" for investments.

Some of the players that use this model are CyberCash™, DigiCash™, Millicent™, NetBill™, OneClickCharge™ and SmartAxis™.

Existing Solutions

Today there is an almost overwhelming number of different and non-different micropayment solutions, some of which have proven successful in a particular niche, others that have not.

Figure 6:
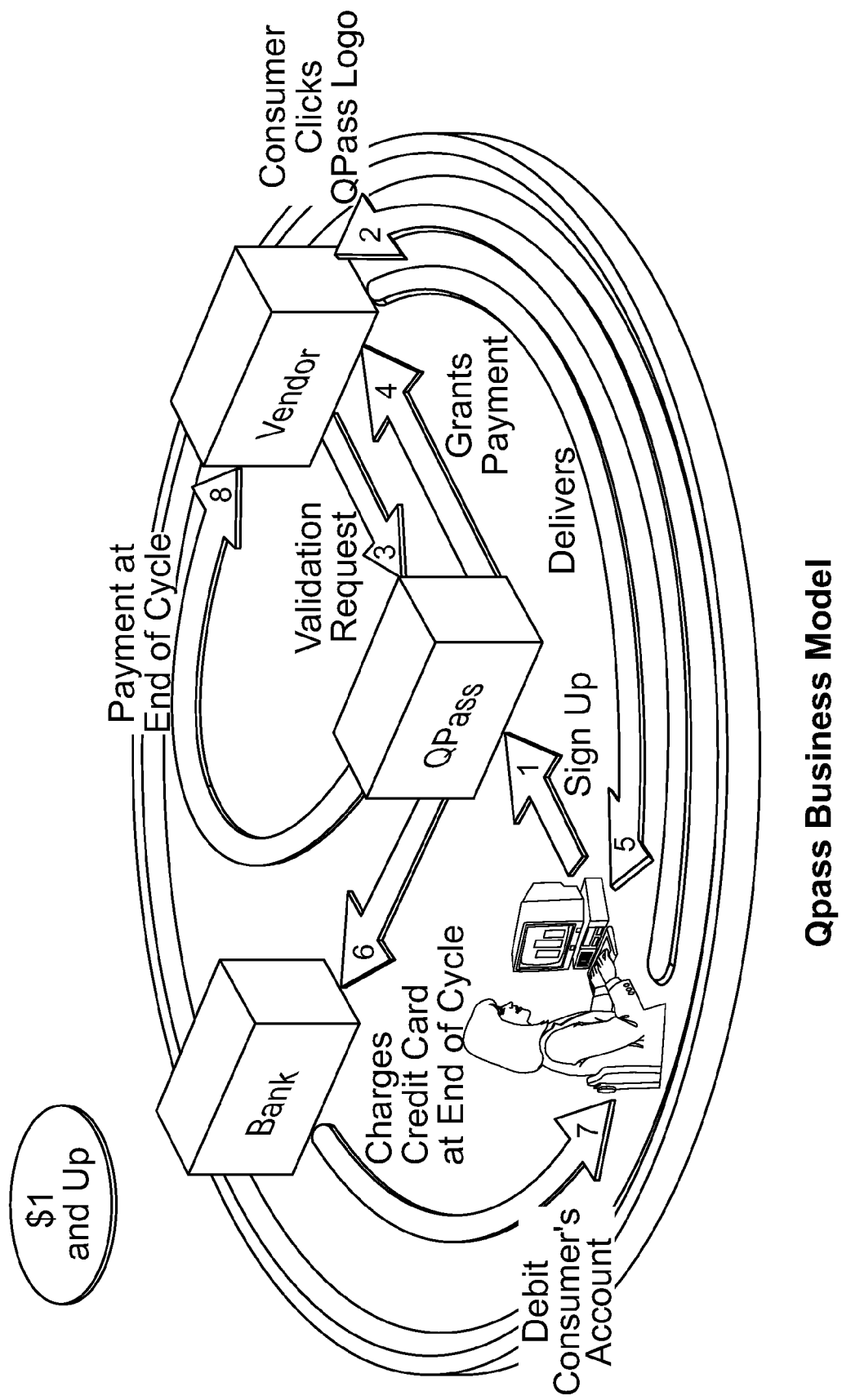
FIG. 6 illustrates an example of a schematic diagram of a Qpass business model.

The micropayment system provider of interest in the preferred embodiment is Qpass™ (www.Qpass.com). FIG. 6 is an example of a schematic diagram of a Qpass business model.

Qpass was founded in June 1997 and first launched its service in March 1999. Among Qpass' content partners are *The Wall Street Journal*™, *The New York Times*™, Corbis™ and others. Strategic partners comprise Accenture™, Trivnet™, Netcentives™ and more.

Through its system, Qpass claims to be able to handle transactions with values as low as $1 and up. Purchases are aggregated by Qpass and charged to the consumer's credit card at the end of the month (see the Qpass Business Model, as shown, for example, in FIG. 6). Qpass recently partnered with Trivnet in order to provide consumer billing through telcos, ISPs and others.

Support for different currencies is planned for the next release. Vendors are paid by Qpass directly.

No additional hard- or software is required for the consumer. For vendors, Qpass provides and installs necessary software enhancements and trains vendor personnel. The service is free for consumers. Vendors pay Qpass an initial installation fee depending on effort and subsequently a share of the sales on a pro-rata basis.

Transaction security is granted through conventional ID and password technique and Secure Socket Layer (SSL) encryption. All consumer data is kept by Qpass unless the user allows forwarding of data to vendors.

Besides easy handling of payments, Qpass provides consumers with a set of administrative functions on its web site to centrally maintain electronic bills (including product passwords and serial numbers received) for purchases from a Qpass-enabled vendor. Additional technical details on the Qpass Transaction Processing Solution can be obtained from their web site at www.Qpass.com which is hereby incorporated fully herein.

While the Qpass system is used in the preferred embodiment of the present invention, there appear to exist many other possible solutions to the micropayment problem. All of the known solutions miss one aspect, however, the independence of a storage medium. To make payments more convenient, an electronic cash solution should enable the user to keep capital on all sorts of media, such as PCs, PDAs, smartcards and on accounts in the network (telco, bank, payment provider). Additionally, it should be easy to transfer funds between different parties, for example via e-mail or even using the file transfer protocol (ftp). The preferred embodiment of the present invention as described in more detail below, provides a system and mechanism for such transfers.

Smartcards

Smartcards are credit card-sized plastic cards with an integrated memory and microprocessor chip. The use of smartcards ranges from the simple storing of personal and/or valuable information to holding and running complete software applications.

SIM-cards (Subscriber Identification Module) are a special variant of smartcards, used in European GSM phones. SIM cards are able to execute applications on the mobile handset and can even modify its menu structure. Applications can either be written using a proprietary platform, provided by the card manufacturer, or according to the SIM Application Toolkit specification (part of the GSM standard). The latter will run on almost all mobile phones, manufactured after 1998. This section gives a GSM-specific overview of what kind of applications are possible with smartcards. It therefore concentrates on the description of the SIM Application Toolkit and what development tools are available. Another focus is set on mobile smartcard readers (dual-slot mobile phones) and how these enable eCommerce. Additionally, different approaches to provide prepaid solutions, using smartcards, are described below.

SIM Application Toolkit

SIM Application Toolkit ("SIM Toolkit" or, "STK") is an ETSI (European Telecommunications Standard Institute) standard for Value Added Services (VAS) and eCommerce over GSM mobile phones.

In 1995, the first ideas and draft documents were specified as a result of some network operator's desire to offer service differentiation without the need for mobile manufacturers having to build different models or variants of their mobile phones. The concept was then incorporated into the GSM standard as part 11.14, later in 1996.

Besides the ability to enhance and change a mobile's menu system, SIM Toolkit allows the flexibility to update the SIM with new services directly downloaded. Moreover, network operators can remotely provision the user's wireless terminal, simply by sending specific codes embedded in SMS messages from the server.

SIM Toolkit applications are generally updated and communicate through SMS messages, but may in the near future move to another means of transport such as Unstructured Supplementary Services Data strings (USDD) or General Packet Radio Service (GPRS).

The features of the SIM Toolkit can be classified into five different categories:

Man-Machine Interface (getting user input, playing sound)

Communication Services (sending SMSs, setting up calls)

Menu Management & Application Control (menu structure)

Accessory Management (Dual Slot phone commands)

Miscellaneous (SIM card settings)

Compared to the Wireless Application Protocol (WAP), the SIM Toolkit is more mature since it is at a later stage in development. In general, SIM Toolkit is seen rather as complementary than competitive to WAP, or at least as a step towards WAP.

Major Players

Since its first release, the SIM Application Toolkit specification has been taken up in several major manufacturers' phone ranges and is supported by a variety of new and established network operators. These operators have even stipulated that all new phones supplied on their network must support the SIM Application Toolkit.

Handset Manufacturers

As of October 1998, the major handset manufacturers have, or have committed to SIM Toolkit compatible handsets (including NEC™, Sagem™, Ericsson™, Philips™, Nokia™, Sony™, Panasonic™, Motorola™, Siemens™, Alcatel™, Mitsubishi™ and Bosch™).

SIM Toolkit commands have been grouped into classes for handsets to support (classes apply to handsets, not to SIM cards). Up to date there are three classes, as detailed in Table 1.

TABLE 1

SIM Application Toolkit Classes (Source: ETSL GSM 11.14)

| SIM Application Toolkit Command | Class 1 | Class 2 | Class 3 |
| --- | --- | --- | --- |
| Cell Control | | ✓ | ✓ |
| Cell Broadcast Download | | ✓ | ✓ |
| Display Text | | ✓ | ✓ |
| Event Download | | | ✓ |
| Get Inkey | | ✓ | ✓ |
| Get Input | | ✓ | ✓ |
| Get Reader Status | | | ✓ |
| Menu Selection | | ✓ | ✓ |
| MO Short Message Control | | | ✓ |
| More Time | | ✓ | ✓ |
| Perform Card APDU | | | ✓ |
| Play-Tone | | | ✓ |
| Polling Off | | ✓ | ✓ |
| Poll Interval | | ✓ | ✓ |
| Power On Card | | | ✓ |
| Power Off Card | | | ✓ |
| Provide Local Information | | ✓ | ✓ |

TABLE 1-continued

SIM Application Toolkit Classes (Source: ETSL GSM 11.14)

| SIM Application Toolkit Command | Class 1 | Class 2 | Class 3 |
|---|---|---|---|
| Refresh | | ✓ | ✓ |
| Select Item | | ✓ | ✓ |
| Send Short Message | | ✓ | ✓ |
| Send SS | | ✓ | ✓ |
| Send USSD | | | ✓ |
| Set-up Call | | ✓ | ✓ |
| Set-up Event List | | | ✓ |
| Set-up Menu | | ✓ | ✓ |
| SMS PF Download | | ✓ | ✓ |
| Timer Management/Timer Expiration | | | ✓ |

Support of SIM Application Toolkit is optional for handsets. However, a handset claiming to support all SIM Toolkit functions, does not necessarily need to support them all, but at least all functions within a class (see Table 1). An overview of current handsets that support SIM Application Toolkit is given in Table 2.

TABLE 2

SIM Application Toolkit compatible handsets

| Manufacturer | Model(s) | Class 1 | Class 2 | Class 3 |
|---|---|---|---|---|
| Alcatel | One Touch Easy | ✓ | ✓[1] | |
| Alcatel | One Touch Club/Club + | ✓ | ✓[1] | |
| Alcatel | One Touch Max | ✓ | ✓[1] | |
| Alcatel | One Touch Pocket | ✓ | ✓[1] | |
| Alcatel | One Touch Easy Dual Band | ✓ | ✓[2] | |
| Alcatel | One Touch View Dual Band | ✓ | ✓ | |
| Bosch | GSM 509/509 Dual | ✓ | ✓ | |
| Bosch | World 118 | ✓ | ✓ | |
| Bosch | Dual-Com 73S | ✓ | | |
| Bosch | GSM 908 | ✓ | | |
| Bosch | GSM 909 Dual/Dual S | ✓ | ✓ | |
| Ericsson | T28s/T28 World | ✓ | ✓ | |
| Ericsson | T18s | ✓ | ✓ | |
| Ericsson | T10s | ✓ | ✓ | |
| Ericsson | A1018s | ✓ | ✓ | |
| Mitsubishi | Trium Galaxy | ✓ | ✓ | |
| Mitsubishi | Trium Astral | ✓ | ✓ | |
| Mitsubishi | Trium Gro | ✓ | ✓ | |
| Mitsubishi | Trium Aria | ✓ | ✓ | |
| Mitsubishi | Trium Cosmo | ✓ | ✓ | |
| Motorola | Timeport L7089 | ✓ | ✓ | ✓ |
| Motorola | v 3688 | ✓ | ✓ | |
| Motorola | Star TAC 130 | ✓ | ✓ | |
| Motorola | CD92x | ✓ | ✓ | |
| Motorola | CD93x | ✓ | ✓ | |
| Motorola | L2000 | ✓ | ✓ | |
| Motorola | L7089 | ✓ | ✓ | |
| Motorola | P7389 | ✓ | ✓ | |
| Motorola | M30 | ✓ | ✓ | |
| NEC | DB500 | ✓ | ✓[3] | ✓[3] |
| NEC | DB2000 | ✓[3] | ✓[3] | ✓[3] |
| NEC | DB4000 | ✓ | ✓[3] | ✓[3] |
| Nokia | 3210 | ✓ | ✓ | |
| Nokia | 5190[4] | ✓ | ✓ | |
| Nokia | 6150 | ✓ | ✓ | |
| Nokia | 6190[4] | ✓ | ✓ | |
| Nokia | 7110 | ✓ | ✓ | |
| Nokia | 7190[4] | ✓ | ✓ | |
| Nokia | 8210 | ✓ | ✓ | |
| Nokia | 8850 | ✓ | ✓ | |
| Panasonic | GD90 | ✓ | ✓ | |
| Panasonic | GD70 | ✓ | ✓ | |
| Panasonic | GD50 | ✓ | ✓ | |
| Panasonic | GD30 | ✓ | ✓ | |
| Philips | Savy/Savy DB | ✓ | ✓ | |
| Philips | Genie/Genie DB | ✓ | ✓ | |
| Philips | Xenium | ✓ | ✓ | |
| Sagem | GPRS | ✓ | ✓ | ✓ |

TABLE 2-continued

SIM Application Toolkit compatible handsets

| Manufacturer | Model(s) | Class 1 | Class 2 | Class 3 |
|---|---|---|---|---|
| Samsung | SGH-800 | ✓ | ✓ | |
| Samsung | SGH-2100 | ✓ | ✓ | ✓ |
| Samsung | SGH-2200 | ✓ | ✓ | ✓ |
| Siemens | S25 | ✓ | ✓ | |
| Siemens | S2588 | ✓ | ✓ | |
| Siemens | C25 | ✓ | ✓ | |
| Siemens | SL10 | ✓ | ✓ | |
| Siemens | S10/S10 active | ✓ | ✓ | |
| Siemens | S11 | ✓ | ✓ | |
| Siemens | C10/C10D | ✓ | ✓[5] | |
| Siemens | C11 | ✓ | ✓[5] | |
| Sony | C1 | ✓ | ✓ | |

[1]With firmware version 3.0 or higher.
[2]With firmware version 14.0 or higher.
[3]Only partially.
[4]GSM1900 phone.
[5]Only partially.

Network Operators

Since the introduction of the standard SIM Toolkit, it has been supported by Dutchtone™ (Netherlands), Orange™ (UK), D1 T-Mobile™ and VIAG™ Interkom (Germany), Telecom Italia™ Mobile (Italy), KPN Orange" (Belgium) and many more.

A variety of SIM Toolkit powered value-added services exist in production today.

Development Tools and Products

Today, almost all of the SIM card manufacturers offer application development suites to develop programs according to the SIM Application Toolkit (GSM 11.14) standard. However, those environments differ in capabilities such as Java and multi-platform (multi-SIM) support.

In order to resolve those issues, a group of major players (GEMPLUS™, Giesecke & Devrient™, ORGA™ and Schlumberger™) has recently formed the SIM Alliance. Microsoft™ is also getting into co-operations to promote Visual Basic™ and Windows for Smartcards™ in order to get a stake in this market.

Figure 7:
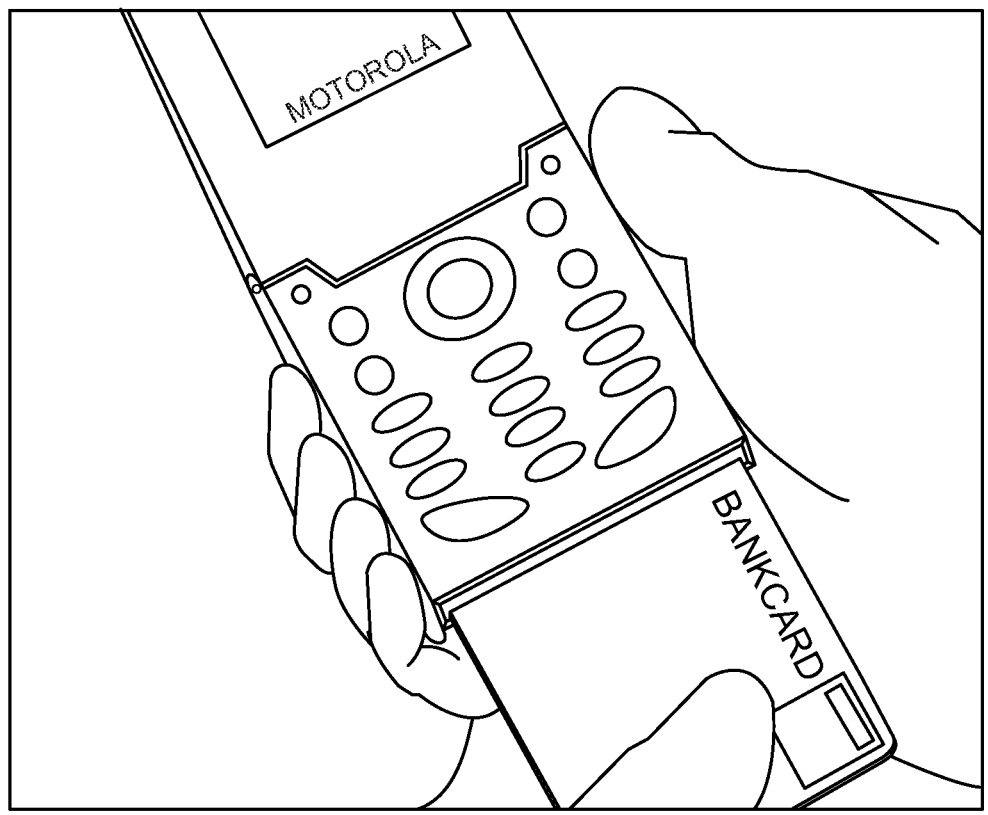
FIG. 7 illustrates an example of a diagram of a dual-slot phone.

Dual slot phones, such as shown in FIG. 7, are mobile phones with an integrated smartcard reader. They allow the extension of smartcard-based payment concepts to the wireless terminal. Any smartcard, be it a credit or banking card or a prepaid public phone card, could be used to conduct payments directly from a mobile phone, thereby turning it into a mobile payment terminal.

Taking the example of prepaid cards, dual-slot mobile phones could enable these to suddenly become a much broader means of payment. Not only could they be used to make phone calls in public phones but also to pay for mobile calls or even goods and services.

TABLE 3

Dual-Slot Mobile Phones

| Manufacturer | Model(s) |
|---|---|
| Alcatel | One Touch Pocket[6] |
| Motorola | StarTac D |
| Motorola | Timeport L7089[7] |
| Sagem | MC 840M |

[6]Alcatel has developed a working prototype that was announced but finally never released. A new version has again be announced for the fourth quarter of 2000.
[7]Not yet launched.

Some major advantages are immediately visible:
  Replacement cards can be purchased literally everywhere, the distribution infrastructure is already in place;
  Prepaid cards are widely accepted, they are handy and help people keep track of their spending;
  No time-consuming and expensive online credit limit verification is needed, transactions are cheap and fast;
  Just like cash, payments are anonymous.

However, only the future will show if these advantages are sufficient for the success of dual-slot mobile phones. Although some major manufacturers such as Motorola, Alcatel and Sagem have developed handsets (see Table 3), so far no real public rollout has been achieved.

Prepaid Solutions

Prepaid systems can be used today to pay for all kind of services and goods. There are different technical paradigms and ways to recharge prepaid accounts.

Technical Paradigms for Pre-Paid Solutions

Three different technical paradigms can generally be distinguished for prepaid solutions:

Handset Based Solutions

This solution is used to handle prepaid cellular phone accounts only. In this case the handset itself contains software and a chip that stores the pre-paid airtime. The restrictions of this model are obviously that it requires a special handset, which at the same time binds the subscriber to a specific operator. Given the advent of SIM cards and the costs that occur due to the customised production of handsets, this solution is likely to disappear.

Card Based Solutions

In a card-based system the prepaid value is stored on the chip of a smartcard. In addition, this solution requires a GSM Phase 2 compliant phone. Thanks to the so-called Advice of Charge (AoC) and SIM Application Toolkit functionality, the prepaid account can be recharged over the air (usually via SMS). Applications of card-based prepaid solutions reach further than only the handling of cellular phone accounts. Being a sort of digital currency, where the money is directly taken from the card, payments for all kinds of goods and services may be conducted. With the maturation of smartcard technology and given its ease of use, this solution is likely to become dominant in the near future.

Network Based Solutions

In a network-based system the value of the prepaid account is stored somewhere on a server hosted by the network operator. When the account is recharged, then the purchased value is simply added to the current amount, stored on the server. This is by far the most applied solution today. Again, it is mainly applied to handle prepaid cellular phone accounts, however, one could also imagine to pay for goods using such accounts.

Recharging of Prepaid Accounts

A variety of different concepts exist to recharge prepaid accounts, some of which apply to public or cellular phone systems only. Others may be used to recharge prepaid accounts for any kind of payments such as for cantina lunches or to buy beverages from vending machines Replacing the Card The most common, and simplest, solution for "recharging" a prepaid account is to actually buy a new pre-charged card. Production of smartcards has become so mature that cost is no longer an issue.

Automatic Recharging

In this solution the subscriber's prepaid account is automatically re-charged in chunks of the agreed value, once the subscriber's account goes under a predefined threshold, the amount is usually either directly debited from the bank, or charged to the consumer's credit card.

Recharging by Call

In this case, the subscriber has to actually call a phone operator or service provider to re-charge the account. Again, payment may be deducted from the bank, or charged to a credit card. In countries such as Italy, consumers can also buy specific scratch cards. These contain a secret number to be communicated to an automatic response application under a predefined phone number. In Italy, it is also possible to recharge your prepaid account at ATMs. The consumer simply has to enter their phone number and PIN code and the amount is then automatically deducted from their bank account, and the bank reports the new prepaid balance to the network operator.

Recharging by SMS

Similar to the recharging by call, in this case the subscriber has to send a short message (SMS) to the network operator, who in return, will refill the account. Payment is conducted in the way that was agreed upon the consumer's subscription.

Recharging Using Public Phone Infrastructure

Some cellular phone operators such as French Itineris™ allow their subscribers to recharge their accounts using the existing public phone infrastructure. Since most of the public phones today are equipped with smartcard readers anyway, a subscriber can simply walk into a phone booth, dial a special number and code and insert his banking or credit card. The selected amount is then added to his prepaid account on the network or over the air to his SIM card.

Dual Slot Phones

A new kind of handsets, equipped with an integrated smartcard reader, enables this way of account recharging. To do so, the subscriber would, for example, use a SIM Toolkit application provided by the network operator to select the amount. Subsequently, the subscriber would pay by simply inserting his credit card into the phone's second slot and punching in the PIN code.

Applications for Prepaid Systems

A large variety of different applications are offered today when using prepaid solutions:

Public and Mobile Phones

For public and mobile phones, simple throwaway memory cards are sold with a preloaded value to be deducted with each call. This is the most common application for prepaid card systems and it is available in almost any European country.

Vending Machines

Companies often provide prepaid cards to their employees to be used with vending and coffee machines.

CANTV™, the largest telecommunications provider in Venezuela, goes even beyond this and has recently introduced a program that allows owners of prepaid phone cards to use these for other purposes, such as buying beverages at vending machines Given the huge investment that telecoms have put into smartcard infrastructure, these kinds of concepts are likely to be copied by other major players.

Public Transport and Parking

In Switzerland, precisely in Geneva and Lausanne, prepaid smart cards are used to pay for public transportation such as busses. People can thereby avoid the need to carry change all the time for payments.

US-based POM™ Inc. manufactures parking meters that are able to read and deduct parking fees from prepaid smartcards. The advantage of this system is that it is fairer, since it allows payment on a per minute basis, whereas traditional systems usually charge in blocks of 15 minutes.

Internet Access and Purchasing

Philippines' WEBSCAPE™ introduced a prepaid Internet access card in 1997. This card provides users prepaid Internet access for a limited amount of time, thereby helping them to keep track of their spending. Moreover, there is massive use of prepaid solutions for purchasing goods on the Internet.

Wireless Application Protocol (WAP)

The Wireless Application Protocol (WAP) was designed to bring Internet content and data services to mobile phones and other wireless terminals.

To achieve this, WAP uses the Wireless Mark-up Language (WML), that is optimised for wireless handheld mobile terminals. WML is a stripped down version of HTML. The WML language is specifically designed to meet the needs of wireless devices.

Figure 8:
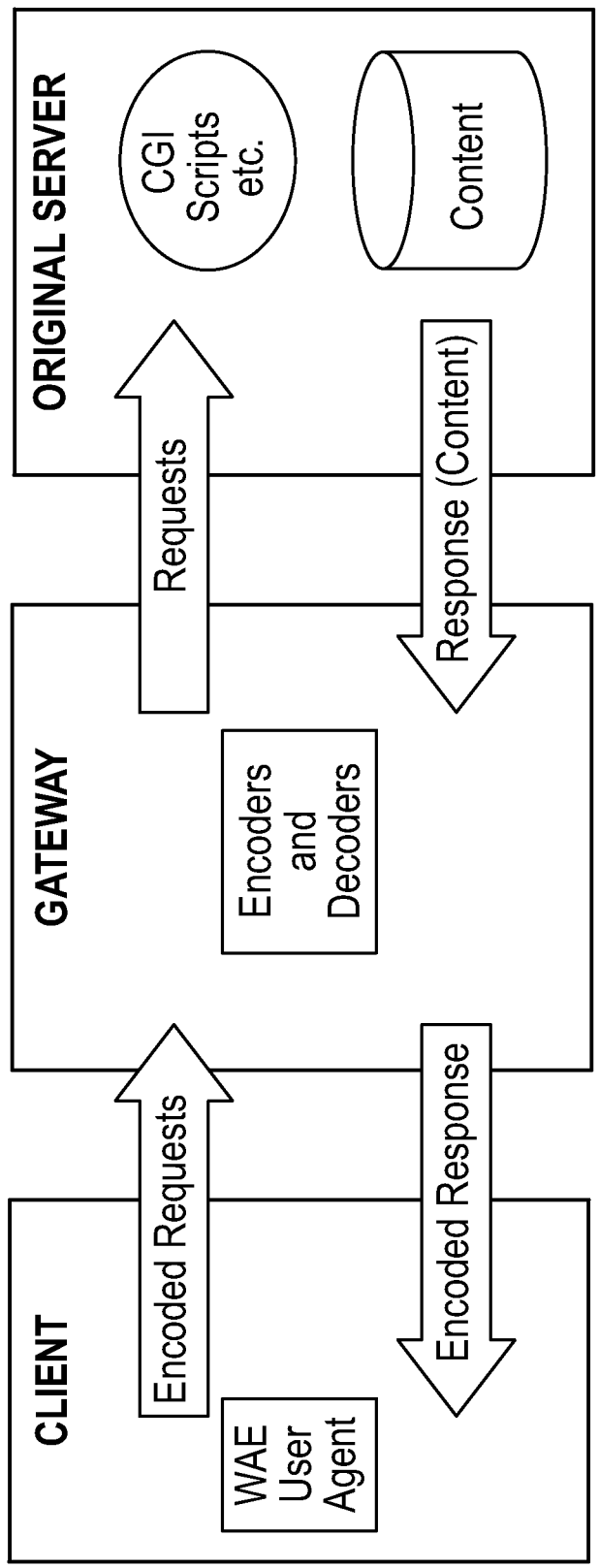
FIG. 8 illustrates an example of a schematic diagram of WAP architecture.

Initially WAP was created by a group of companies such as telecom manufacturers (Nokia™, Ericsson™, Motorola™), network operators (Sonera™, Telia™, AT&T™, DT™, France Telecom™) and software and service companies (IBM™, RSA™, Unwired Planet™, Symbian™). The WAP Forum was founded to ensure the global success of the standard and keep it independent. The technology has been designed to accommodate most of the wireless transmission standards such as CDPD, CDMA, GSM, PDC, PHS, TDMA, TETRA and DECT. Its architecture corresponds with the International Standard's (ISO's) 7-layer OSI model. FIG. 8 shows an example of a schematic diagram of WAP architecture.

WAP also specifies a proxy server (usually hosted by the network provider) that acts as a gateway between the wireless network and the wireline Internet, providing protocol translation. To optimise the data transfer for the limited transmission speeds of today's wireless networks, the gateway translates WAP pages into so-called bytecode.

Still WAP is rather new, with only a few terminal devices available today. Within the next 3-4 years, however, WAP devices are expected to globally outnumber personal computers as the major access device for Internet services.

Among the list of devices, available today, are recent handsets from Nokia™ (6150 and 7110), Ericsson™ (E320 and R380), Siemens" (S25), Mitsubishi™ (T250) and Samsung™ (SGH-810). Apart from handsets, a variety of WAP servers, gateways and microbrowsers for PDAs are available.

WAP Identity Module (WIM)

The current WAP version 1.1 provides no security features that are vital for applications such as online banking and purchasing. This is why the WAP Forum has created the WAP Identity Module (WIM) specification.

WIM is a mechanism that can be implemented as an application running on a smartcard or be placed on a tamper resistant device such as a mobile phone. WIM is intended to provide the same level of security for mobile commerce applications that currently can only be achieved through SIM Toolkit.

The WIM will address two fundamental security issues. The first one is securing the wireless transport layer (WTLS) between the WAP gateway server and the mobile client terminal. This can be considered the same kind of functionality as the Secure Socket Layer (SSL) used on the Internet today. WIM will ensure mutual authentication and confidentiality using cryptography algorithms that are stored on the smartcard or device.

The second part of the security function is to secure the application layer through the use of digital certificates and other non-repudiation techniques. WIM will therefore be using public key and RSA™ encryption technology.

The WIM module is designed in a way that it can either run as a stand-alone or together with other applications running on the same smartcard or device. In particular, a smartcard hosting the WIM module does not necessarily need to be a SIM card. For example, the WIM module could just as well reside on a banking card, in order to allow secure mobile payments with a dual-slot phone. WIM functionality is accessible to WAP applications (using WML script) as well as to standard smartcard applications.

Given the importance of WIM for future mobile commerce applications, a number of major smartcard manufacturers are currently developing such cards. Among these new products is the ConnectIC™ SIM card by Oberthur Card Systems™ and the Simera E-motion™ by Schlumberger™ (using PKI technology from Entrust™). Both cards will support Java™ and be compliant with the WAP 1.2 WIM specification.

WAP vs. SIM Application Toolkit

Although WAP is network-based, whereas SIM Toolkit is running on the SIM card inside the handset, both technologies provide a variety of similar functions. Both allow a dynamic user interface to be displayed on the handset and to be automatically updated over the air. However, awaiting the arrival of WIM, WAP does not yet provide security features in the same way as the SIM Toolkit.

Given the advanced maturity of the SIM Application Toolkit (especially of the push-mechanism and for security support) at this stage, both technologies must be considered complementary rather than in direct competition.

Stockholm-based company Across Wireless™ (www.acrosswireless.com) is providing a WAP browser based on SIM Application Toolkit. This software will enable the majority of today's mobile phones to access WAP pages.

However, due to WAP's more dynamic nature and the fact that applications, located on the subscriber's SIM card, are necessarily very 'thin', the balance is likely to change in the future in favour of WAP, as the technology is evolving. WAP is also more flexible in the sense that it leverages the whole Internet infrastructure that is already in place today.

Development Tools and Products

For developers both Nokia™ and Ericsson™ provide free PC-based software simulators (device and browser) and gateway servers.

Major network operators as well as other companies are launching WAP services and companies that set these up for internal use—for example, Accenture™ itself (the assignee of the present invention). Common applications of WAP are the provision of information services such as city maps (SFR), weather forecasts and newsfeeds (France Telecom™) as well as e-mail and banking (Swisscom™).

Also other applications, known from the Internet, are brought to WAP—for instance German Linguatec™ brings you free translations services to your mobile phone. Internet giants like AOL™ are equally investing into their WAP infrastructure and finish Nokia™ have announced to provide Scandic Hotels™, the largest Scandinavian hotel chain, with WAP-based booking services.

After the first enthusiastic wave of WAP pick-up, further development of mCommerce solutions will depend on the standards' security extension. Although planned, currently no real security mechanisms are available for WAP, which is one of the standards' most important drawbacks at this point. Companies like Baltimore Technologies™ and Certicom™ are trying to fill this hole with proprietary security solutions.

A complete list of companies providing WAP services and products, including a description of their offering, is given by the WAP Deployment Fact Sheet, that can be downloaded from www.wapforum.org. The document is constantly being updated.

Bluetooth

Bluetooth is a short range (usually up to 10 meters, with certain restrictions even 100 meters) radio technology that enables high-speed audio- and data-transmissions between devices. The components that will be integrated into such devices are small and expected to become very cheap. Since Bluetooth operates within the globally available Industrial-Scientific-Medical 2.4 Ghz band, world-wide compatibility is ensured. In the future, Bluetooth may well replace current infrared (IrDa) technology.

The invention of the Bluetooth technology goes back to 1994. The name is derived from a Danish Viking king. In February 1998, Ericsson™, Nokia™, IBM™, Intel™ and Toshiba™ decided to form the Bluetooth Special Interest Group to standardise the concept. Since then over 1500 companies, including other major players like Motorola™, 3Com™, Lucent™ and Microsoft™ have joined the wave. It is expected that by 2002 more than 100 million mobile phones will be equipped with Bluetooth technology.

Important Features of the Technical Architecture

Key applications of Bluetooth are the synchronisation of different pieces of equipment such as mobile phones, PDAs and PCs. Additionally, there is data exchange with point-of-sale terminals, ticketing or e-wallet applications for mobile commerce might also boost the success of Bluetooth. Given its throughput of up to 2 Mbit/s, Bluetooth is also well suited for wireless LAN connectivity. This is actually where the majority of the development efforts are currently heading.

Looking at Bluetooth the following wireless main applications can be identified:

Wireless Networking (i.e. LAN access and file transfer)
Device Connectivity (i.e. mobile device to headset)
Synchronisation (i.e. desktop PC to a mobile device)
Universal Phones (i.e. mobile device to be used for local calls alike)

In order to handle the complexity that arises through the connection of so many different appliances, Bluetooth features a set of protocols to automatically identify any Bluetooth-enabled appliances in range, find out about their capabilities and link them together.

IBM was the first with its Salutation Manager, essentially a set of easy-to-use APIs that implement these protocols. In a real system each service or object would have its own Salutation Manager and use it as a single interface to perform its own advertising and to handle communication with other Bluetooth objects. Salutation Managers act as brokers and communicate among themselves on behalf of their objects, using their own specific protocol. Besides service discovery and registry, Bluetooth also standardises checking of service availability and session management.

Development Tools and Products

The availability of Bluetooth development tools and end-user products is still very limited. In fact, only a few hardware providers such as Ericsson™ and Digianswer™ currently offer Bluetooth development Kits.

However, a variety of Bluetooth products have been announced, some of which were already demonstrated as prototypes. For example, Ericsson has recently revealed its wireless headset that allows users of mobile phones to conduct calls while leaving their phone in the pocket. Also Ericsson has announced a portable device that allows browsing the Internet through a Bluetooth connection.

Other products to come are PC wireless LAN cards (TDK™, Widcomm™, Acer™ and Motorola™) and a range of hands-free kits. The constantly growing range of available and planned products is listed on sites such as www.bluetooth.com and www.bluetooth.net.

Mobile Positioning

Mobile positioning technology, based on GSM, gives the ability to locate a mobile phone geographically. GSM positioning is a key technology, which will permit the distribution of highly valuable, localised and personalised information. However, while one can do mobile positioning with Bluetooth and GSM, mobile positioning is not a main purpose of current listed standards for these technologies.

At present, it is too early to determine which of the technologies will dominate the market. The missing link will be to bring companies that provide the content together with geo-coded information, to make use of the technology.

Applications using mobile location service technologies include fleet management, vehicle tracking for security, tracking for recovery in event of theft, telemetry, emergency services, location identification, navigation, location-based information services and location-based advertising.

The following solutions exist today:

Cellpoint™ (formerly Technor Inc.) is located in Stockholm, Sweden. Their GSM positioning solution is based on a concept called Cell Of Origin (COO). Here, the information of the cell that the handset is connected to is mapped against the geographical position by using a database of base stations.

The system requires no modification to the mobile terminal, but the network operator has to do some significant upgrade work. The accuracy of the system depends on the cell size. Therefore, it is usually better suited for urban areas than for rural ones.

In addition to the technology, Cellpoint offers value-added services, starting from personal position identification to locating other persons. For example, when trying to find a friend, the Cellpoint server would send an SMS message to the friend's phone that would (if disclosure of position is enabled) be processed by a SIM Toolkit application. The phone then generates a reply, containing the current cell information, and returns it again via SMS. The Cellpoint server can then map the cell information contained in the SMS to a geographical location.

Ericsson™ provides a proprietary GSM positioning technology, called Enhanced Observed Time Difference (E-OTD) that is currently only available for networks based on Ericsson switches. Ericsson's Mobile Location Center, calculates the phone's position. It works by comparing the relative times of arrival, at the handset and at a nearby fixed receiver, of signals transmitted by the underlying mobile network base stations. The E-OTD system overlays an existing mobile network.

The advantage of this technology is that it allows an accurate and consistent quality of service, independent of the network density at the user's location. Both ETSI and ANSI have decided to jointly develop a GSM mobile positioning standard, based on Ericsson's system.

Alcatel™ provides GSM positioning services through an SMS-based system similar to the Cellpoint one. However, Alcatel offers a WAP-based user interface to access these services, which consists of the transmission of graphical street maps to the mobile handset. Among Alcatel's technology partners for these solutions are GEMPLUS™ and Webraska™.

Cambridge Positioning Systems™ is a UK-based start-up company that provides a GSM positioning system named CURSOR. The system works using triangulation and signal timing between base stations in reach of the handset. The actual calculation is conducted on the network side every time the mobile phone changes base station, so that the information is already available when requested. The accuracy of this system is said to be around 50 m of range.

Binary SMS

The success of SMS, especially among the younger consumers, urges network operators and equipment manufacturers to provide more and user friendly services. This is why Nokia has created its proprietary binary SMS standard.

Binary SMS encodes binary data in normal SMS messages, thereby enabling mobile handsets (provided they support this functionality) to receive and send images and ring tones.

Today several network operators offer Internet portals, where customers can select icons and ring tones and have those sent directly to their mobile phone. Some examples are French Bouygues Telecom™ (www.musicformobile.fr), Finish Sonera™ and German Mannesman™.

The last two have developed their services using an API provided by Finnish Akumiitti™. This product provides support for sending of ringing tones, icons, picture messaging and chat services.

However, given that binary SMS is a proprietary standard, it is currently limited to Nokia phones only. Provided that the number of SMSs are sent directly from one handset to another, Nokia has also developed a messaging platform named Artus™, to cover "mobile-to-mobile" picture messaging.

From this description of current technologies, it can be concluded that:
1) Payment solutions exist "en masse", however, only very few are designed to work for mobile commerce (ehpt, Paybox);
2) Smartcards are widely accepted and will increase in importance and capabilities (memory capacity, processing speed);
3) SIM Toolkit is established and widely used, however, it will eventually be replaced by WAP;
4) WAP, Bluetooth and GSM Positioning are only just emerging, but will have the most substantial impact on the future of mobile commerce.

In the preferred embodiment of the present invention, a subset of these technologies has been chosen to create a demonstrable prototype that showcases the use of such technologies. The preferred embodiment of the present invention is now described in more detail.

The starting-point is the basic proximity device, a Bluetooth chip that can be incorporated in the smallest, lightest mobile phone. With any Bluetooth enabled machine—a drinks-dispenser, photocopy machine, petrol pump or parking meter, for instance—the user can place an order, receive the goods and pay for them electronically via a hand-held device.

In a preferred embodiment, the invention can be used for other purposes, such as accessing the drink vendor's website or using their telephone system. And from the drink vendor's viewpoint, if the company already has an avenue of communication to a customer, they can exploit it to offer other services—perhaps from other suppliers who will be happy to pay a percentage to their new partner. For example, some marketing companies might be happy to offer a free Coke to any customer prepared to give a moment of their time to answer a question or two. And for an impoverished student, such an offer might well be irresistible.

This new marketplace is what applicants call the Bluetooth Service Portal (BSP). Once users have established a connection via BSP, in alternate embodiments users can access additional services. Using their mobile phone to connect to the Internet, a user can be able to choose from a wide range of products and services as and when they want them.

For example, in an alternate embodiment if a customer is using BSP in connection with their Xerox copier, they might wish to order more copy paper, and perhaps additional office supplies at the same time. The overwhelming attraction is that this conduit is absolutely free. Even though you are using your wireless phone, it won't show up on your monthly bill. From the vendor's viewpoint, it is easy to envisage a massive variety of services that Xerox might offer its customers via BSP.

In an alternate environment, Bluetooth technology enables the customer to record preferences, so that, for instance, every time they pass a drinks machine, the machine will be programmed to dispense the customer's favourite drink. But this in turn provides the vendor with customer information that makes it much easier to tailor product offerings in accordance with customer preferences. In still another alternate embodiment, the personalisation of products can be extended, such as for example, a simple prompt from the Bluetooth-enabled phone would communicate with another chip in the car and adjusts the seats, mirrors and steering-wheel to the individual driver before the door is opened.

More specifically, in the preferred embodiment, assume it's a nice and hot day and you are walking by a vending machine that sells drinks. You are very thirsty, but unfortunately you do not have any coins with you. Additionally, you are in transit through a different country and you didn't even pick up foreign currency.

In the preferred embodiment, the drink list of the vending machine, including prices, would automatically appear on your mobile phone's display. So all you would need to do is to select your drink and type in your Qpass™ password, that you are using for your Internet purchases anyway, in order to authenticate.

Your Qpass Membership ID, that happens to be the unique serial number or your phone number, would be requested from the handset directly, taking away the hassle of having to punch this one in. Nonetheless the security of your "mobile wallet" would be granted, since you need to know the secret PIN to unlock your mobile phone upon power up, plus you need to be in possession of the physical device itself.

The vending machine would now drop your can of Coke and you could relax and enjoy your drink. You know that Qpass will send you a detailed bill, with all your purchases at the end of the month, and charge the overall amount to your credit card.

The exemplary embodiment of the present invention will discuss this scenario in more detail below.

In the discussion which follows, the following glossary applies:
ETSI European Telecommunications Standard Institute
GPRS General Packet Radio Service
GSM Global System for Mobile Communications
OTA Over The Air uploading of modified SIM Toolkit applications
SIM Subscriber Identification Module
SMS Short Message Service SMSC Short Message Service Center
SS Supplementary Service
STK SIM Application Toolkit (short: SIM Toolkit)
USDD Unstructured Supplementary Services Data
USSD Unstructured Supplementary Service Data
VAS Value Added Services
Mobile Device Commands In the preferred embodiment, an exemplary set of mobile device commands are shown in the document titled "Nokia 6090 AT-command set and interfaces" Outline version 1.31 dated 27 Mar. 2000, which is hereby fully incorporated herein by reference.

The following describes both a high- and a low-level architecture of how an exemplary system of the present invention is implemented.

Figure 9:
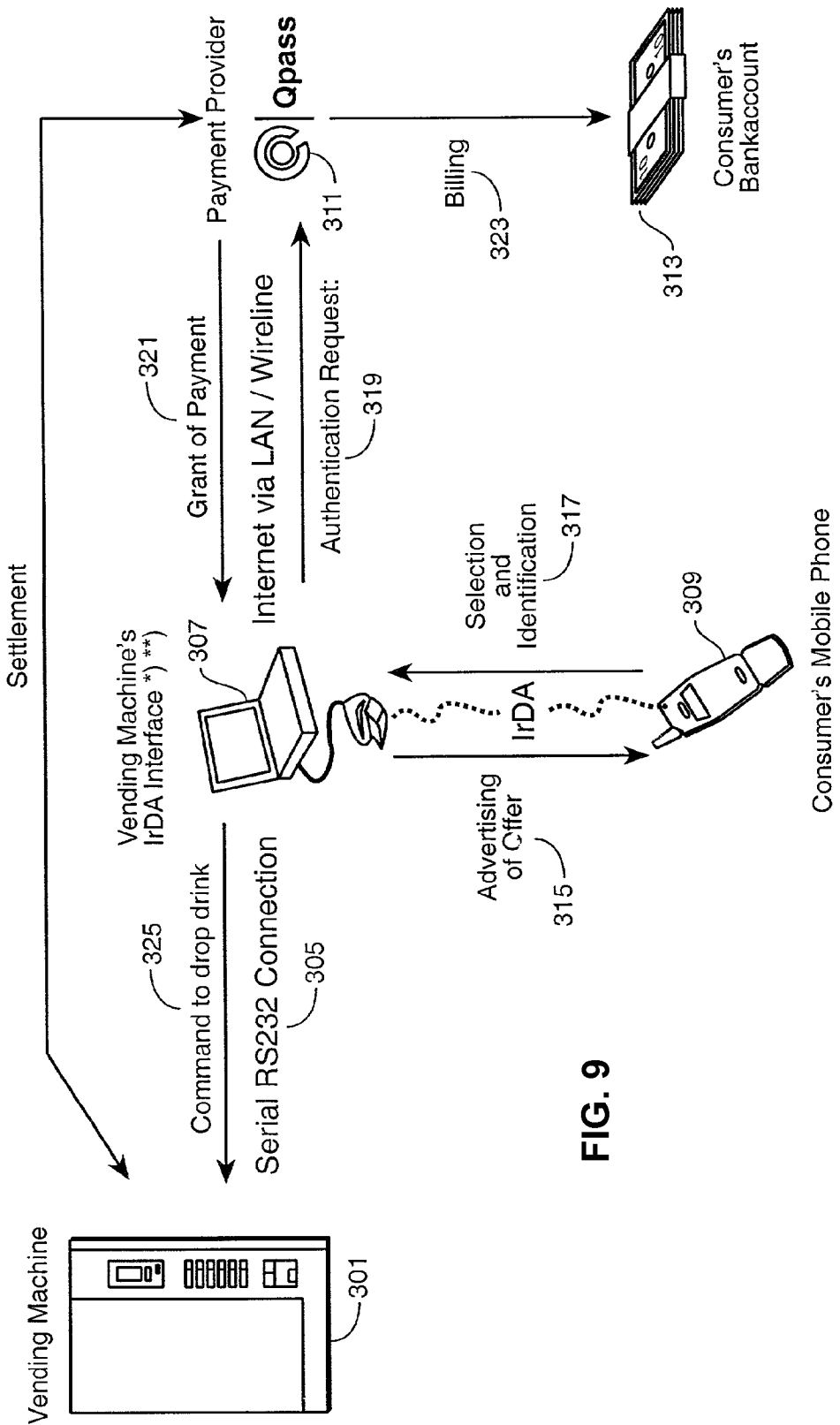
FIG. 9 illustrates a block diagram of an exemplary use of the present invention.

In FIG. 9 an exemplary system is used to demonstrate the usability of the described technologies, in a concrete, useful and discrete application: an Internet Micropayments to the Real World scenario. In FIG. 9 the following exemplary technology is used:

Hardware
a Sielaff™ vending machine, equipped with an RS232 interface to connect it to a PC
an Ericsson™ Bluetooth-enabled phone
a Digianswer™ PCMCIA Bluetooth card
Software
Sun JAVA 2 JDK 1.3 (for PC side server development)
Manufacturer SDKs
Qpass™ server.

Turning now to FIG. 9 a system comprising the following pieces is shown: a vending machine 301 of type Sielaff FK 185 EC with a RS232 interface 305 connected to a Compaq Laptop 307 with Digianswer Bluetooth card. The laptop computer 307 runs custom-written software that simulates a virtual vending machine, sends commands to the real physical one (if connected) and handles transactions with a Qpass service center 311. The Qpass service center 311 is itself connected to the consumer's bank by way of the user's credit card account 313. Finally, an Ericsson T28s mobile phone 309 with a wireless transmission channel adapter and a SIM card running custom-written software and using SIM Application Toolkit features is provided. With this exemplary configuration, the Compaq laptop 307 has an wireless transmission channel adapter (or in the future a special component to be integrated into the vending machine) and runs custom-written software (WUMPI logic of the present invention) that simulates a virtual vending machine and sends commands to the real machine 301, and handles transactions with Qpass 311. In this simple exemplary application, the vending machine 301 transmits its advertising/offer via its wireless transmission channel to mobile devices in range 315 which causes the mobile device 309 to display the advertising/offer. The user identifies himself (via a PIN) and selects one of the offered products 317. A SIM Toolkit Application on the mobile device 309 sends the selection and the WUMPI logic on the laptop 307 forwards transaction information throughout the network 319 to the operator payment provider 311. The payment provider 311 logs the transaction and adds it to the consumer's bill or deducts amount from the consumer's prepaid account 323 and returns a grant of payment signal to the virtual vender (laptop in this case) 321 who in turn signals 325 the vending machine to dispense the selected product.

Figure 10:
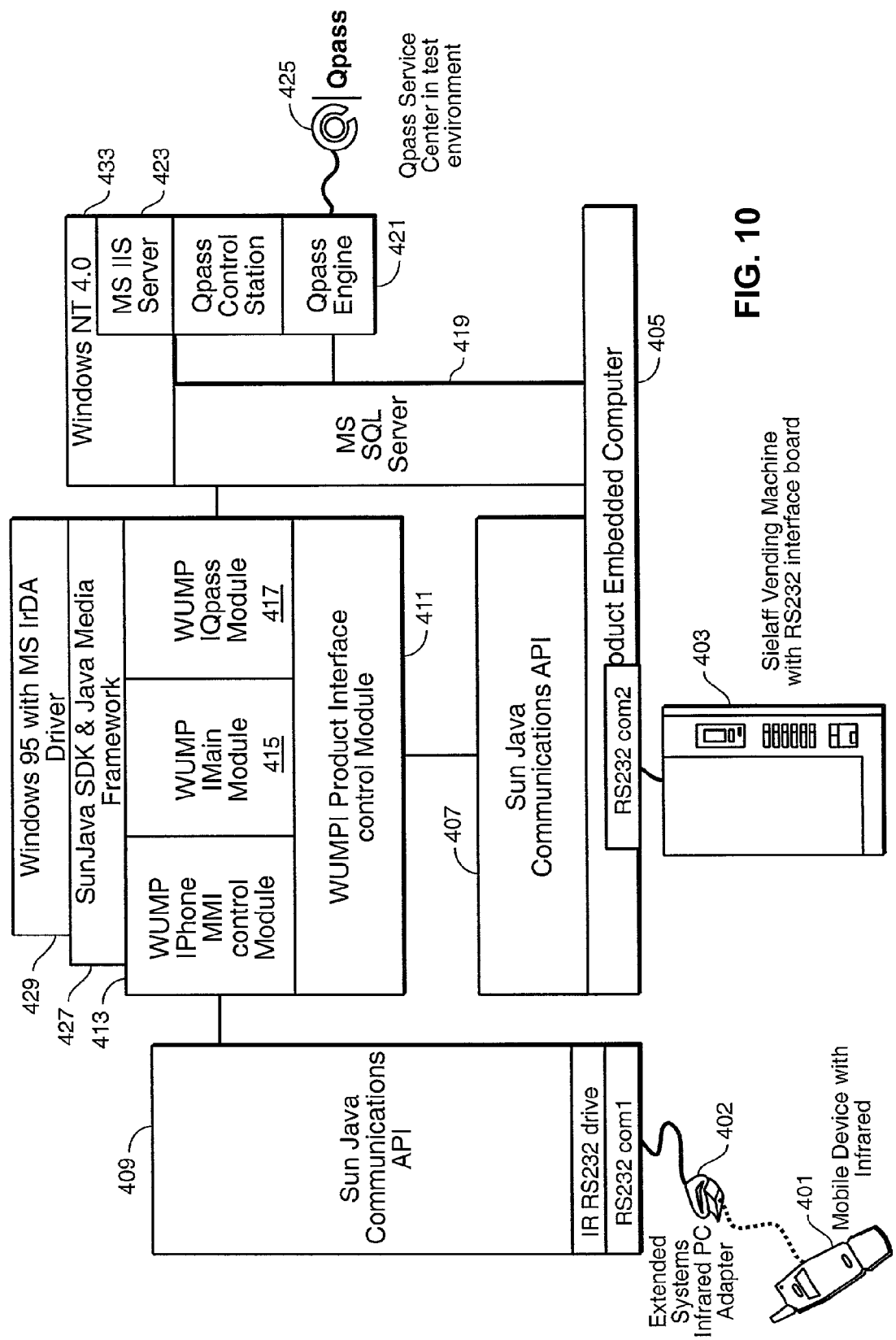
FIG. 10 illustrates a block diagram of an exemplary configuration of a system using the present invention.

Turning now to FIG. 10, a block diagram of the functional architecture of the exemplary computer system is indicated. Once again a mobile device with an wireless transmission channel modem 401 is assumed to be within range of the vending device containing an embedded computer 405. In this case the computer platform 405 has an extended systems wireless transmission channel PC adapter 402. Coupled to the computer platform 405 is a Sun JAVA communications Application Program Interface (API) system 407, 409 and an MS SQL Server module 419. Couples to the Sun JAVA communications API system 407 a WUMPI product Interface control module 411 which itself is coupled to a WUMPI Phone MMI control module 413, a WUMPI main module 415 and a WUMPI Qpass Module 417. The WUMPI Qpass Module 417 is coupled to the MS SQL Server module 419 which is coupled to a Qpass control station Qpass engine 421 and a MS IIS server 423. The Qpass control station Qpass engine 421 provides the communications services to the Qpass service center 425.

Requirements

To run the Mobile Service Link (WUMPI) prototype, you will need the following:

Hardware

| Ericsson Mobile Phone T28s or R320s
| Ericsson Mobile Office IrDA modem adapter DI-28[8]
| GSM SIM card[9]
| Extended Systems serial IrDA adapter Jet Eye PC
| Standard Intel PC or Laptop[10]
| Sielaff vending machine FK-185 ECX with RS232 interface
Software

| Mobile Service Link Installation CD ROM
Note this software system is described functionally below

[8]Only in combination with an Ericsson T28s phone (the R320s has an integrated IrDA modem).
[9]A SIM card is only needed to power the phone up. The demo works fine without network connection (i.e. in the United States) and with an expired SIM card.
[10]The PC should be reasonably fast (PII-400 or above) for the video animations.

6 Hardware 1 Ericsson Mobile Phone T28s or R320s 1 Ericsson Mobile Office IrDA modem adapter DI-28.sup.8 1 GSM SIM card.sup.9 1 Extended Systems serial IrDA adapter Jet Eye PC 1 Standard Intel PC or Laptop.sup.10 1 Sielaff vending machine FK-185 ECX with RS232 interface Software 1 Mobile Service Link Installation CD-ROM Note this software system is described functionally below. .sup.8 Only in combination with an Ericsson T28s phone (the R320s has an integrated IrDA modem). .sup.9A SIM card is only needed to power the phone up. The demo works fine without network connection (i.e. in the United States) and with an expired SIM card. .sup.10 The PC should be reasonably fast (PII-400 or above) for the video animations.

Operating System

Please note that the Mobile Service Link prototype best runs under a Windows 9x environment. Installation under Windows 2000 and Windows NT4 is possible (necessary drivers are provided on the Mobile Service Link CD), however, cumbersome due to missing native IrDA support.

The simulation version (without IrDA communication and phone interaction) will install and run fine on any system configuration.

Set-Up

The set-up procedure for the Mobile Service Link demo consists of running the automatic Mobile Service Link installer and making some additional manual modifications afterwards.

During the Mobile Service Link Set-Up

To install the Mobile Service Link demo, insert the Mobile Service Link Installation CD-ROM into the CD-ROM drive of your PC. The Install Shield set-up should launch automatically (if it does not, run SETUP.EXE from the CD's root directory). Follow the installation instructions.

The installer will install the Mobile Service Link demo and launch the installers of the required third-party components (Microsoft Infrared Driver 2.0, Sun Java 2.0 JDK 1.3 and Sun Java Media Framework 2.1). It is generally recommended to use the default settings of the setups.

Microsoft Infrared Driver 2.0 (Windows 9x Setup)

Figure 11:
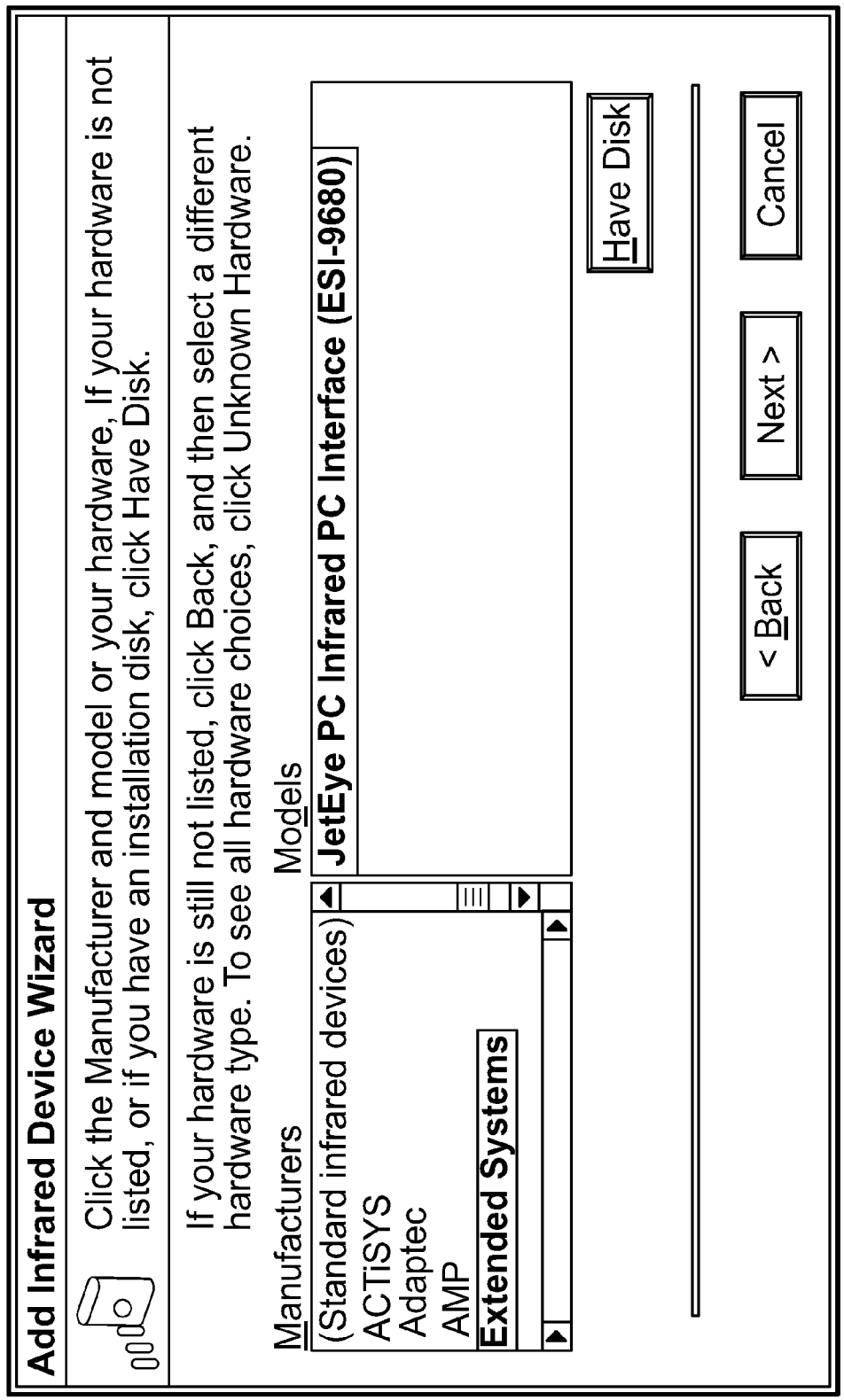
FIG. 11 illustrates an example of a diagram of a screenshot of selecting an infrared device.

Choose the appropriate wireless transmission channel device when prompted by the Microsoft Infrared Driver set-up (Internal IrDA driver or Extended Systems JetEye PC). FIG. 11 is an example of a diagram of a screenshot of selecting an infrared device.

Figure 12:
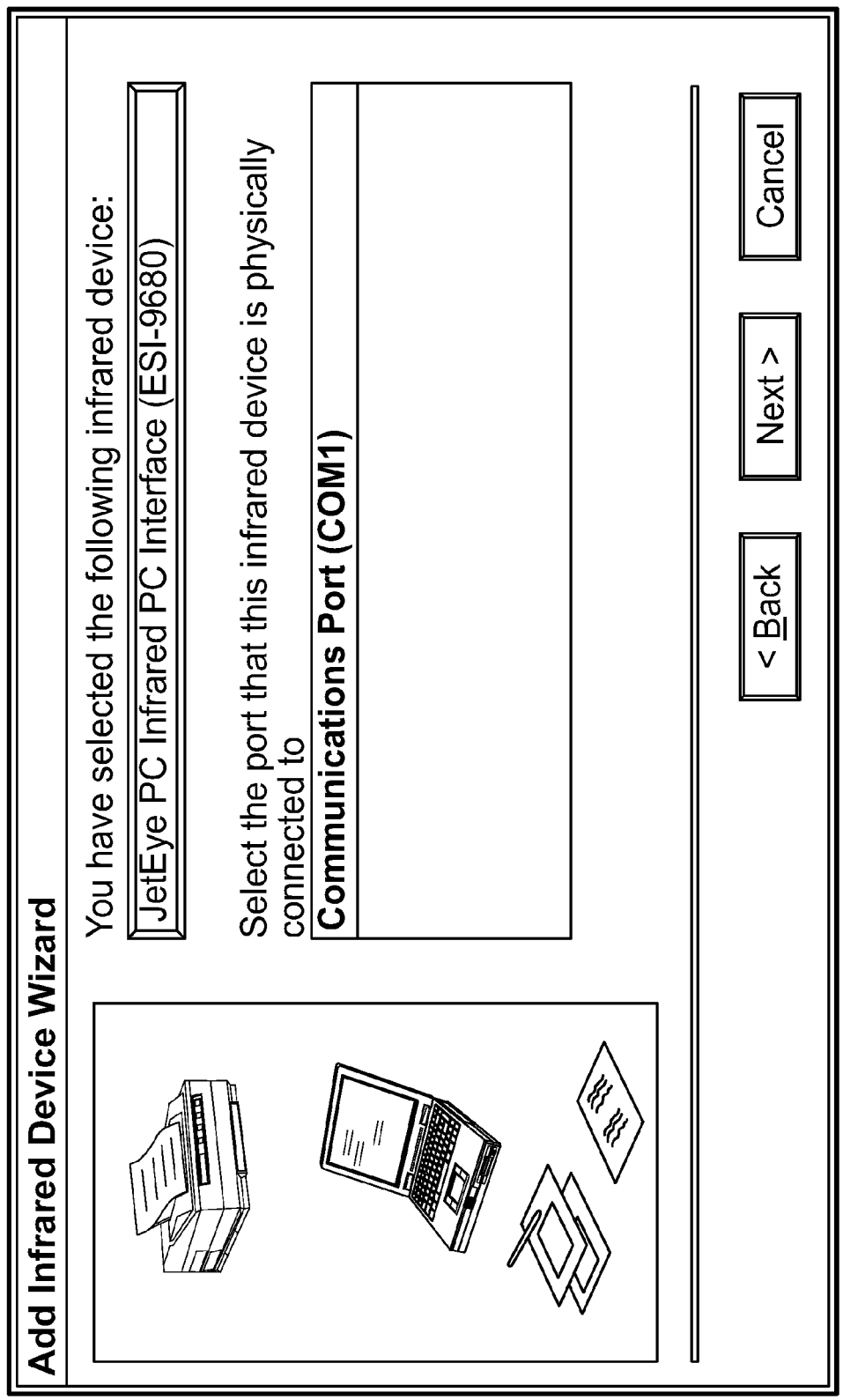

Select the physical COM port to which you will attach the wireless transmission channel device (in case you are using an external one). FIG. 12 is an example of a diagram of a screenshot of selecting a COM port to attach to.

Figure 13:
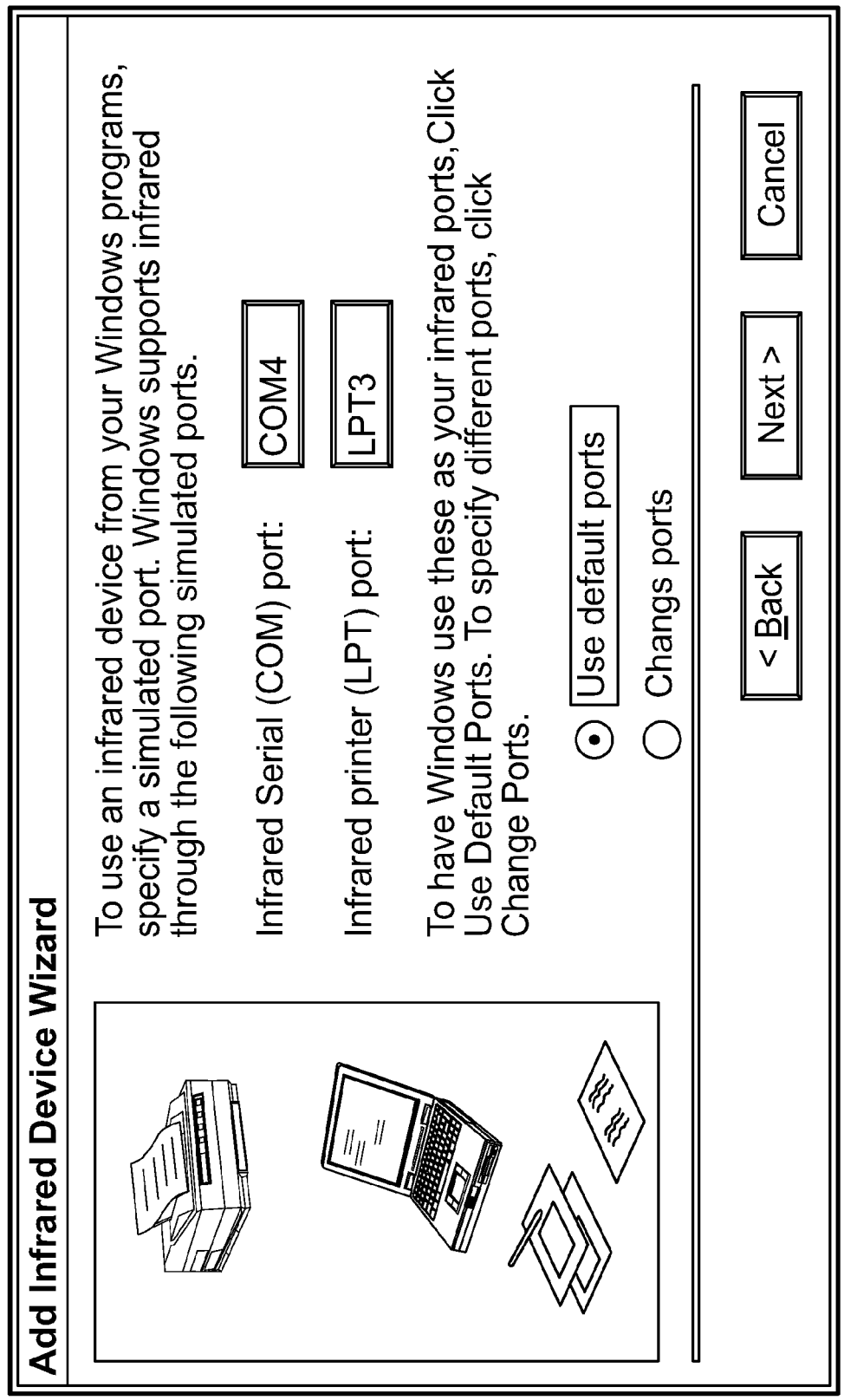
FIG. 13 illustrates an example of a diagram of a screenshot of selecting a virtual COM port.

Finally make sure, that the wireless transmission channel driver will provide application support with a virtual port setting of COM4. FIG. 13 is an example of a diagram of a screenshot of selecting a virtual COM port.

Note: If this port is not available in the list, you may have to uninstall an existing wireless transmission channel driver first and then rerun the set-up manually from the \Install\MSIR20 folder.

Ericsson Communications Suite 1.2.2 (Windows 2000 Setup)

Getting the Mobile Service Link demo to run under a Windows 2000 environment is problematic, due to missing support for a virtual COM port. However, Ericsson provides a driver within its Communications Suite, that enhances the built-in IrDA driver with a virtual COM port.

Nevertheless setup still is a hassle and may very likely require manual adjustment. It has proven to work best with the built-in IrDA port of a laptop, rather than by using an external Extend Systems JetEye PC IrDA adapter.

Figure 14:
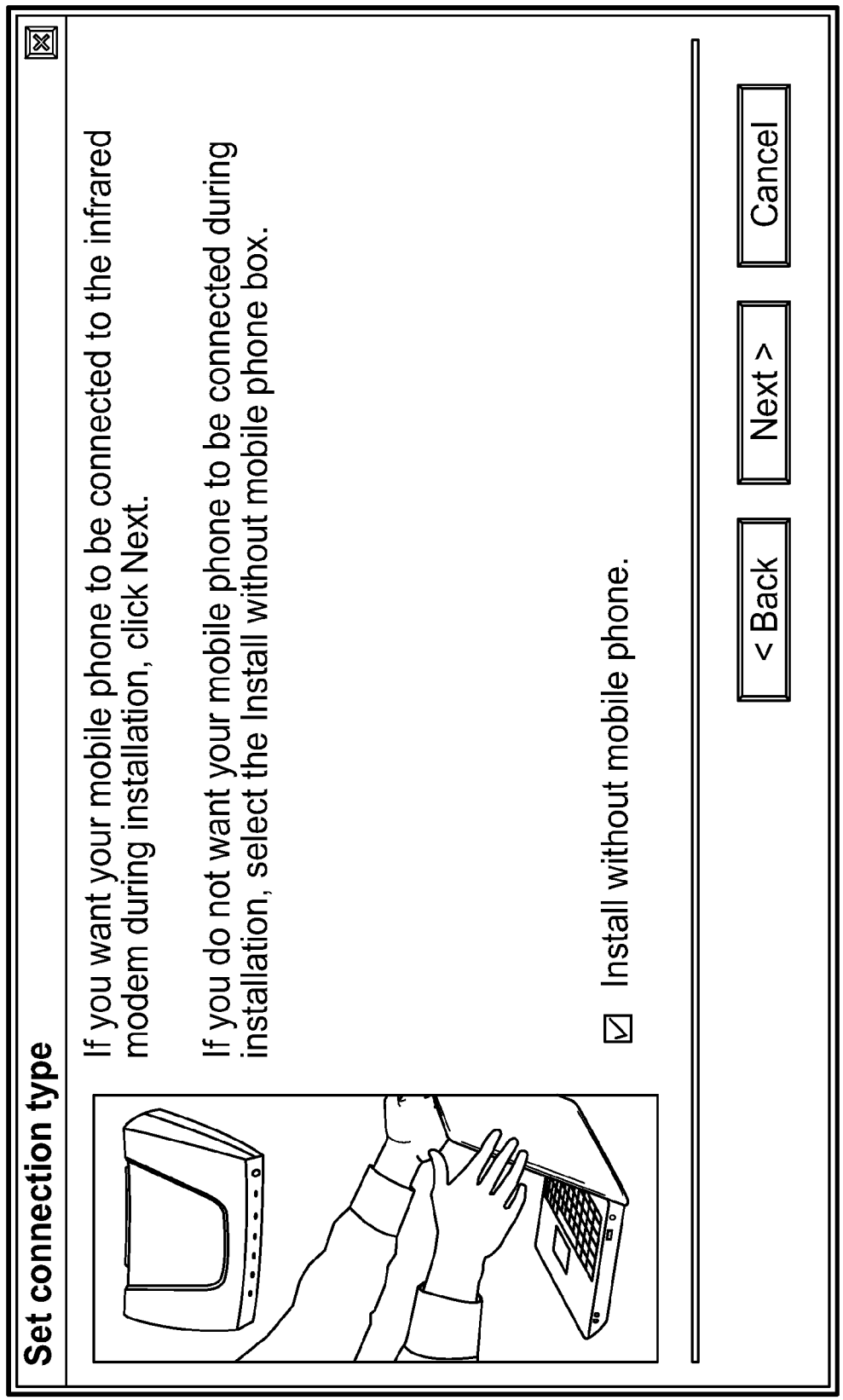
FIG. 14 illustrates an example of a diagram of a screenshot of installing without a mobile phone.

When you encounter the subsequent screen during setup of the Communications Suite, make sure you check the Install without mobile phone checkbox. FIG. 14 is an example of a diagram of a screenshot of installing without a mobile phone.

Figure 15:
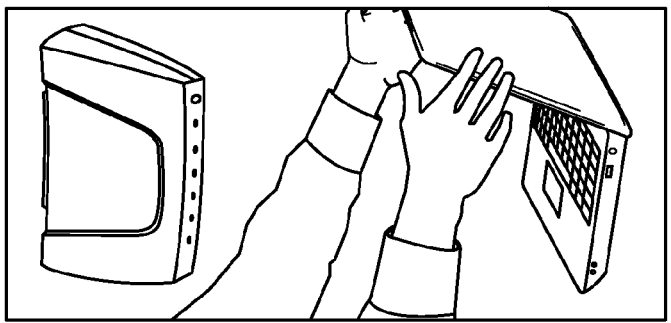
FIG. 15 illustrates an example of a diagram of a screenshot of deselecting unneeded components.

Subsequently you will be prompted to select the software components you wish to install. You can deselect all but the mandatory components, since the basic IrDA driver is really all you need. FIG. 15 is an example of a diagram of a screenshot of deselecting unneeded components.

The Communications Suite will usually install a virtual COM port in the range of COM7 or COM13 (check Windows 2000 Device Manager for actual port). You need to modify the batch files, located in C:\MobileServiceLink folder, that are used to start the Mobile Service Link demo in order to reflect this port setting (batch files are pre-installed with a setting of COM4).

Extended Systems Quick Beam Suite 3.4 (Windows NT4)

Getting the Mobile Service Link demo to run under a Windows NT4 environment is problematic, due to missing support for a virtual COM port. However, Extended Systems provide a driver within its Quick Beam Suite, that enhances Windows NT4 with an IrDA driver that supports a virtual COM port.

Nevertheless setup still is a hassle and may very likely require manual adjustment.

Follow the setup steps as suggested by the Quick Beam Suite and preferably select a virtual COM port setting of COM4. Otherwise you will need to modify the batch files that are used to start the Mobile Service Link demo (located in C:\MobileServiceLink folder) in order to reflect this port setting (batch files are pre-installed with a setting of COM4).

Sun Java 2.0 JDK 1.3

Figure 16:
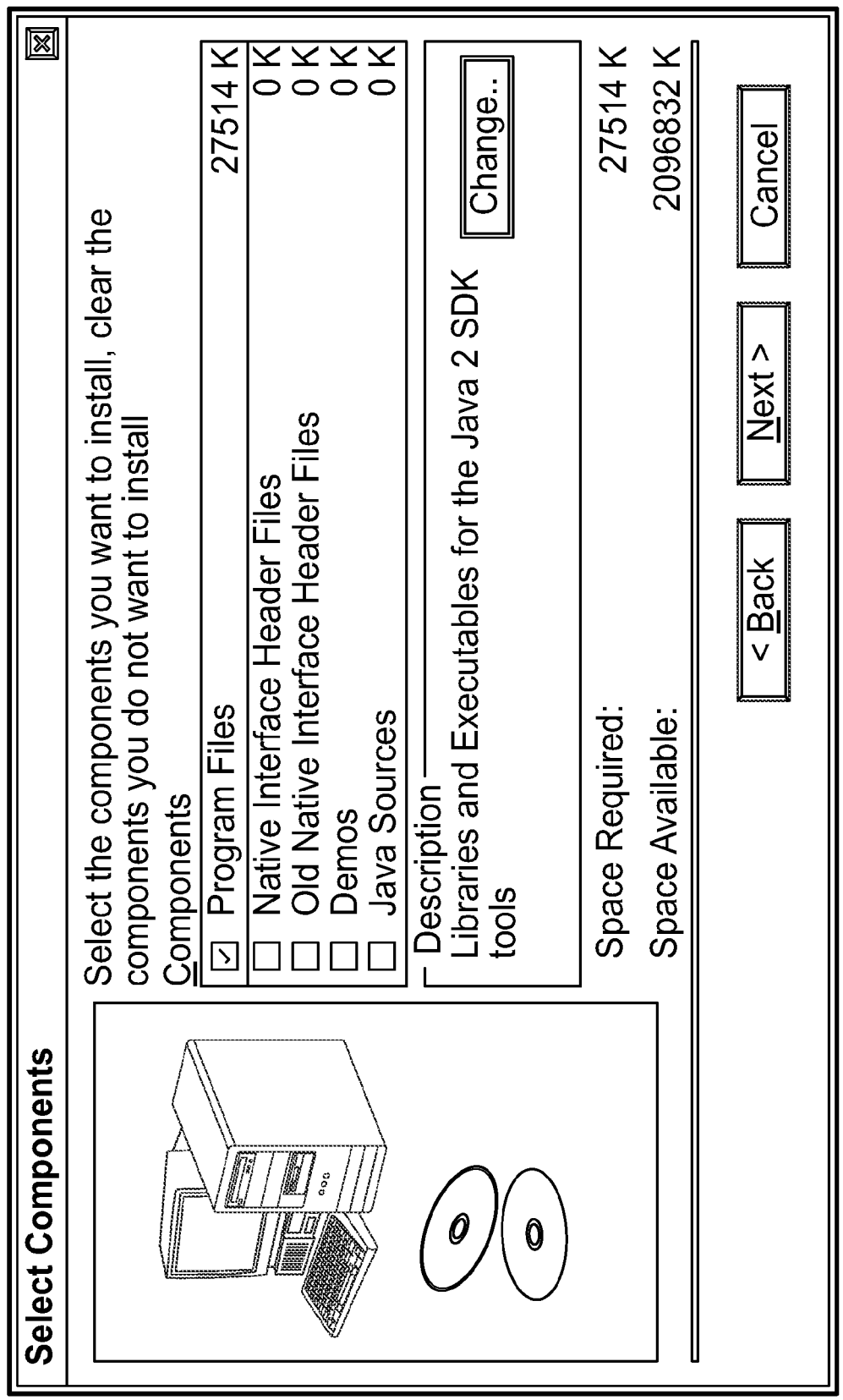
FIG. 16 illustrates an example of a diagram of a screenshot of JDK 1.3 required options.

You need only install the option Program Files. FIG. 16 is an example of a diagram of a screenshot of JDK 1.3 required options.

Do not reboot if prompted following set-up.

Note: since a JDK will be installed with which the Mobile Service Link demo has been tested, no other JDK should be present on the same machine Sun Java Media Framework 2.1

Figure 17:
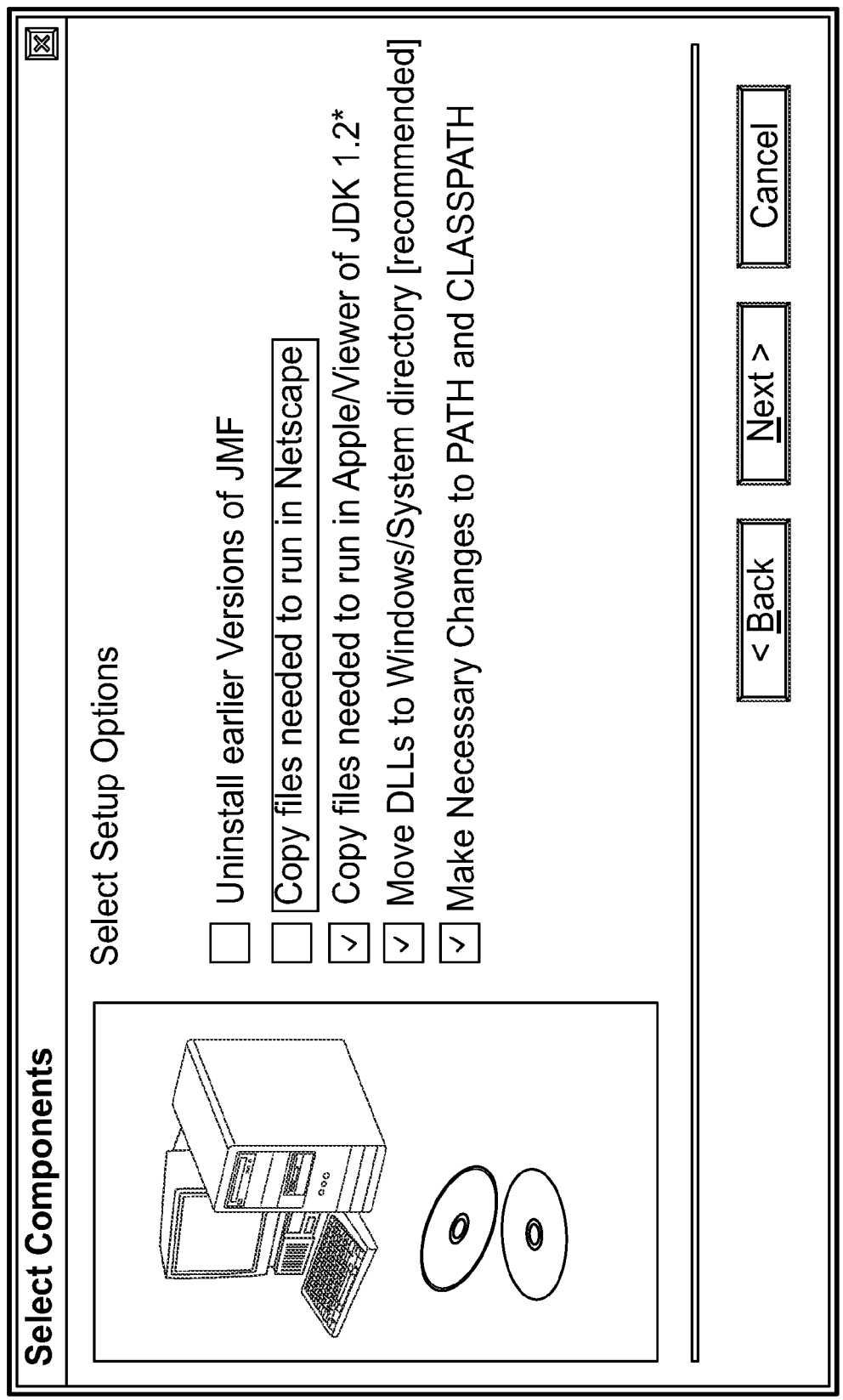
FIG. 17 illustrates an example of a diagram of a screenshot of JMF 2.1 required options.

In case you have a previous version of JMF installed, select to uninstall it first. Otherwise deselect the uninstall option. You do not need to install support for Netscape. FIG. 17 is an example of a diagram of a screenshot of JMF 2.1 required options.

Figure 18:
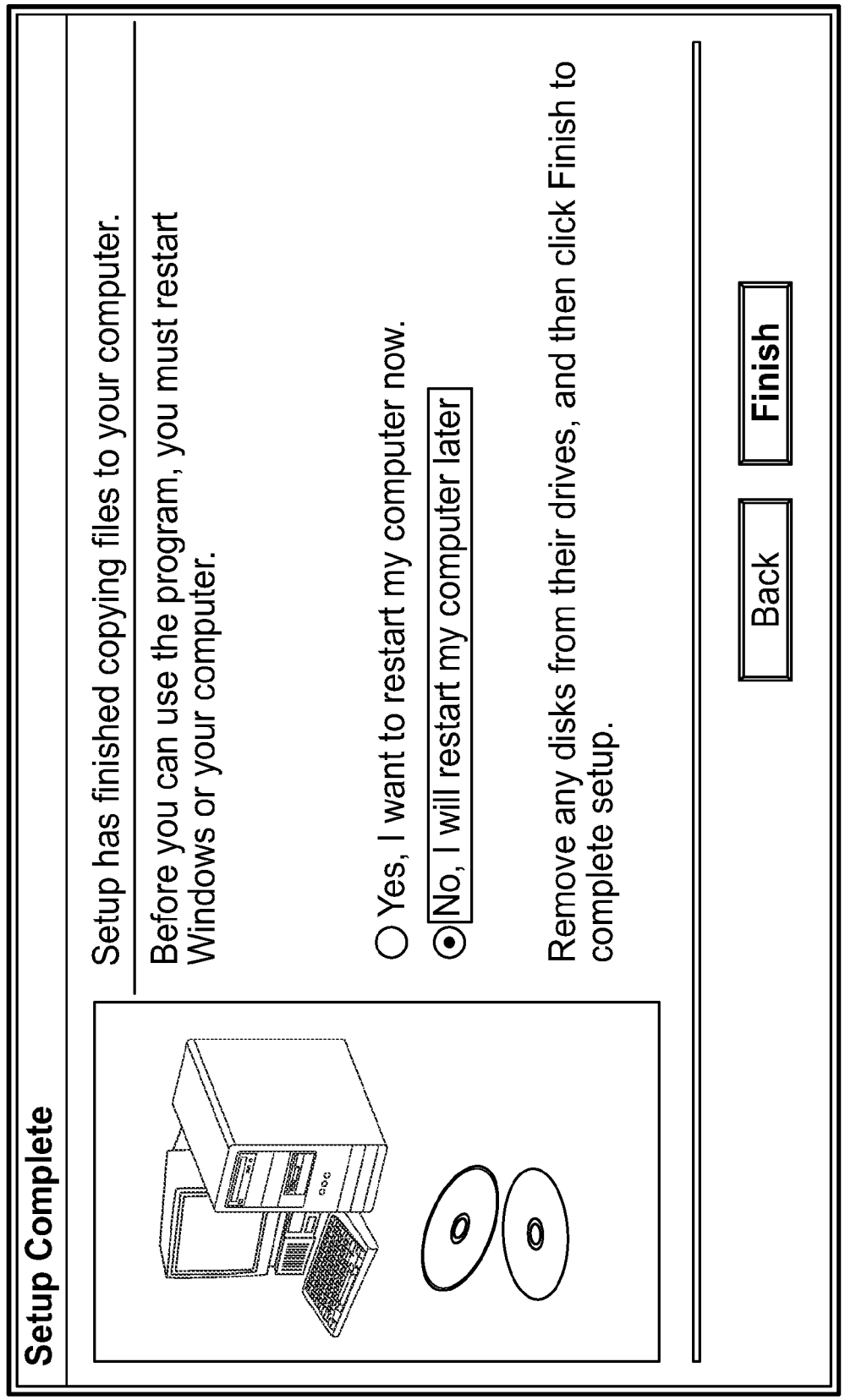
FIG. 18 illustrates an example of a diagram of a screenshot of selecting No, when prompted to reboot.

Do not reboot when prompted following set-up. FIG. 18 is an example of a diagram of a screenshot of selecting No, when prompted to reboot.

Only after the entire Mobile Service Link installation (including all 3 third party setups) has completed, reboot your machine. You will find a Mobile Service Link folder in your Start menu.

Manual Steps Following Mobile Service Link Set-Up

When the overall Mobile Service Link installation has completed and you have rebooted your system, please perform the following manual modifications before running the demo.

Microsoft Infrared Driver 2.0 (Windows 9x Environment)

Figure 19:
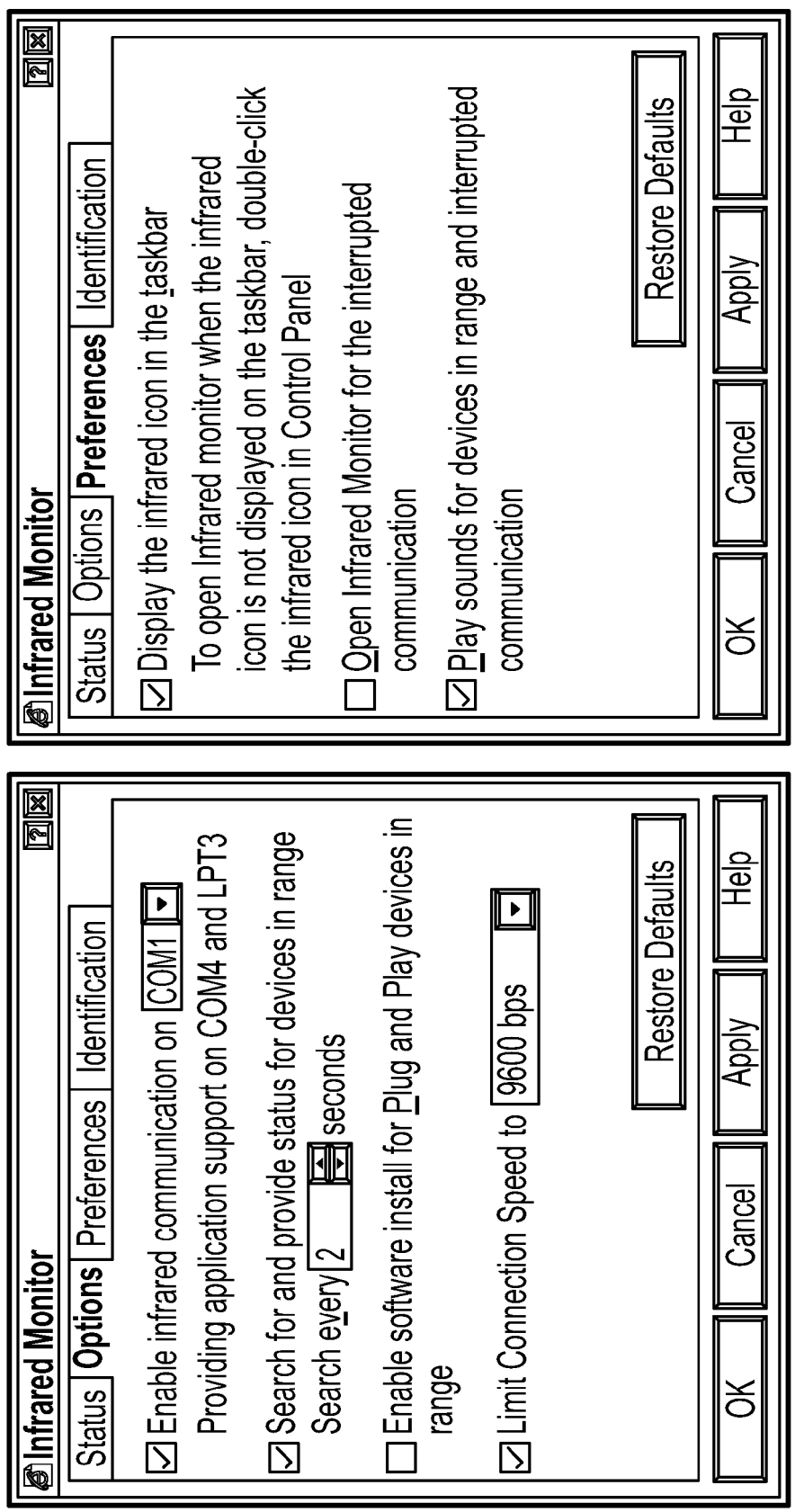
FIG. 19 illustrates an example of a diagram of a screenshot for Microsoft Infrared Driver Set-up.

FIG. 19 is an example of a diagram of a screenshot for Microsoft Infrared Driver Set-up. Launch the Microsoft Infrared Monitor from Settings→Control Panel. Make sure the Options and Preferences settings match the ones shown in the Microsoft Infrared Driver Set-Up Figure, as shown, for example, in FIG. 19.

Qpass Membership Account

Figure 20:
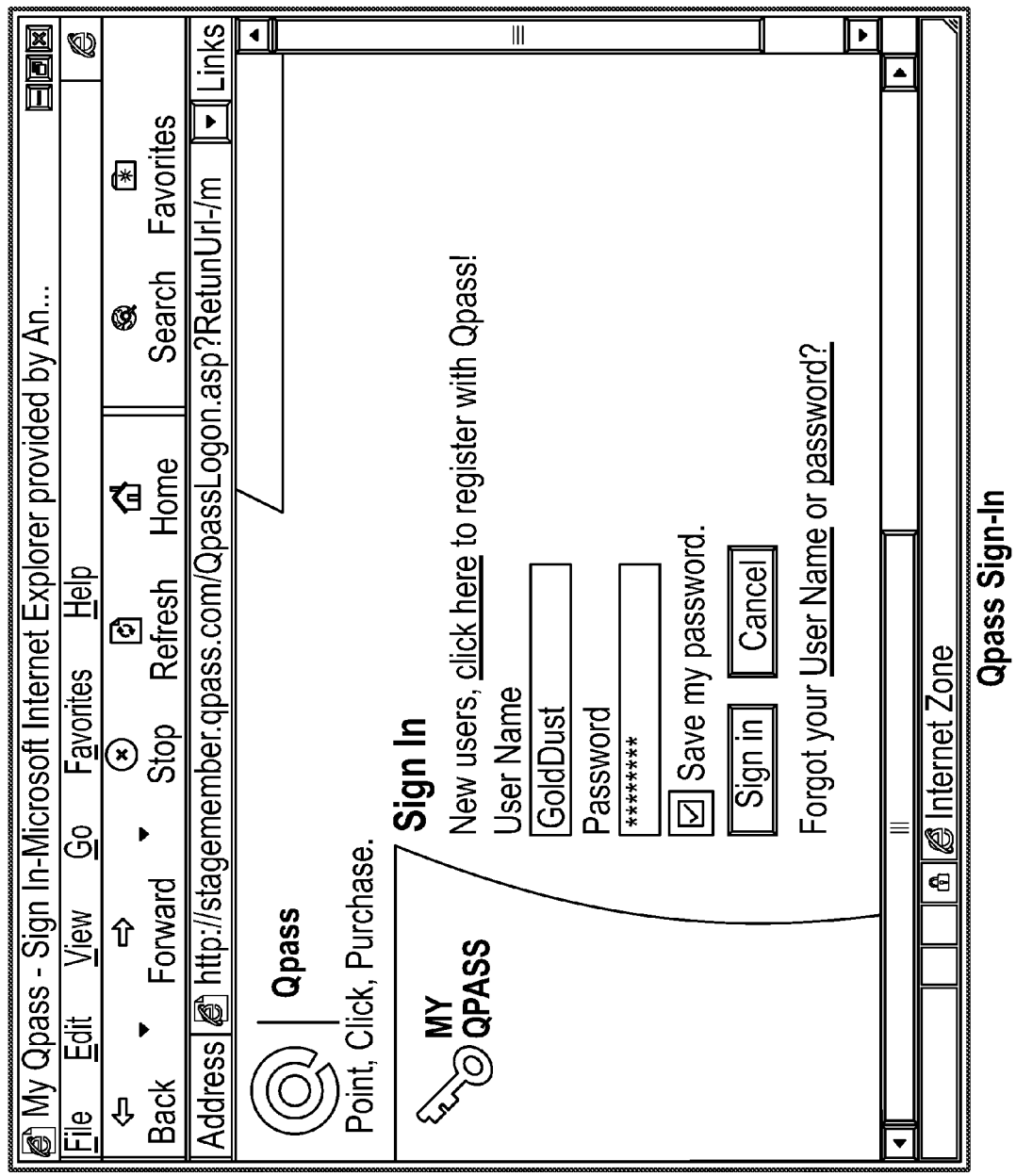

In case you requested so, a Qpass user account will have been setup for you in order to run the live demo. FIG. 20 is an example of a diagram of a screenshot for Qpass sign-in.

In order to access your account launch Internet Explorer and go to sandmember1.qpass.com using the https prefix. This will bring up the Qpass log-in page (see Qpass sign, as shown, for example, in FIG. 20). Bookmark this page. Use your phone's IMEI number (printed inside the phone behind the battery) as user name and your password. Check the Save Password option.

The first time you click Sign In, another page will appear, requesting an e-mail address for verification.

Setting Up the Vending Machine

In case you have a real physical vending machine of type Sielaff FK 185 ECX, you will need to make some manual modifications before you can attach it to a PC controller.

First of all you will need to create a cover for the right-hand side of the machine, in order to hide the coin slot and buttons. The cover should preferably be a piece of resistant, white, plastic with size 1660 mm×197 mm×4 mm (broad×height×depth) and round edges.

At the position where the coin slot used to be, it shall contain a square hole for the wireless transmission channel adapter, with size 40 mm×30 mm (broad×height) and with the upper left corner located 500 mm from the top and 85 mm from the left of the cover.

The cover can be attached to the vending machine using velcro tape. This allows easy removal in order to access the lock to open and refill the machine.

On the inside of the machine you shall fix the wireless transmission channel receiver in the right position, mount the display towards the inside of the machine, detach and remove the drink selection keys and connect the PC (preferably a laptop) to the RS232 interface of the machine.

Note: you must use a NULL-modem cable (crossed serial cable) to connect the PC to the vending machine.

When everything has been modified and the PC is installed and connected to the wireless transmission channel receiver and the vending machine, you need to set the vending machine to free delivery mode.

In order to do this, use the keypad located on the inside of the machine and type (keys symbolized by square brackets): [M], [7], [E], then repeatedly [M] until the display says "KREDITSYSTEM", then repeatedly [1] until the display says "FREIVERKAUF", then [E] to confirm the selection, and finally repeatedly [L]+[M] together until the display says "BETRIEBSBEREIT".

Now all that is left is to fill up the vending machine with drinks. Each column takes around 80 cans, so the whole machine takes around 480 cans.

Note: the vending machine is built for European power supply (230V/50 Hz). So for usage in the US or other countries you will need a power transformator that converts from the local power standard to the European one. Although this should not give any problems, the manufacturer does not take over any warranty in this case.

Demo Instructions

The following gives a step-by-step run through description of a typical Mobile Service Link examplary demonstration.

Preparation and System Start

Switch on your mobile phone and click on the IrDA modem adapter if you are using an Ericsson T28s. If you are asked to enter a PIN code, the default code is 0000.

If you are running the demonstration without a real vending machine, you should set the audio level of the demonstration PC high enough to be sure that you can hear it, even with the audience talking. This is to give you audible confirmation for the status of the IrDA connection, otherwise you may never know if the connection has been established or not. If a real vending machine is attached, audible confirmation is not necessary, since the machine will light up once a phone has been detected.

Microsoft's IrDA Monitor will beep once if it detects the phone and will continue beeping if the connection is lost while open. Try the connection once, by holding the phone's IrDA port to the IrDA port of the PC/Vending Machine. Do this to check that the volume is high enough and to investigate the best distance and angle for the demo as well. A good distance is usually between 1 and 3 meters, depending on the light. You should try to hold the phone in a horizontal position.

To launch the demo, use one of the shortcuts that have been installed in the Mobile Service Link folder of your Start menu. The following shortcuts are installed by default.

Mobile Service Link Online

In this configuration purchases are processed real-time with the Qpass account that corresponds to your mobile phone. The account's Membership ID (the serial number of the mobile handset) and the password you enter will be used for authentication and transaction processing. You need an Internet connection and a Qpass account for your specific phone to run the demo with this set-up.

Mobile Service Link Offline

In this configuration, transaction processing with Qpass is only simulated. The password you enter will be authenticated, but no purchases will be registered with Qpass.

This set-up should be used if no Internet connection or Qpass account is available, or if the demo needs to be kept brief.

Mobile Service Link Override

In this configuration, purchases are processed real-time with the default Qpass account (Membership ID: Mobile Service Link, Password: Mobile Service Link). This account will override the serial number of the mobile handset and the password you enter. Authentication will therefore always succeed. You need an Internet connection to run the demo with this set-up.

This set-up should be used if no specific Qpass account for your mobile handset has been set-up, but you still want to show live transaction processing.

Mobile Service Link Simulation

In this configuration, a one-drink purchase is simulated without interaction with a mobile phone. A drink will be chosen at random. The timings are set in a way that allows the presenter to explain what is happening. No transactions will be processed by Qpass.

This set-up should be used if no mobile phone or wireless transmission channel adapter is available.

Depending on your needs, you may want to launch the demo manually. To do so, open a command prompt and change to the Mobile Service Link root directory by typing CD \Mobile Service Link (followed by the RETURN key).

Then start the demo with the command run <Parameters> <Switches> (followed by the RETURN key). Parameters and switches are defined as follows:

Mobile Service Link Controller

This configuration is reserved for use with a real vending machine only. The software acts as a pure controller and no graphical user interface and no videos will be displayed. Text-based debug information will be output to the console instead.

The simplified interface allows to run the demo on less powerful machines FIG. 21 shows an example of a diagram of a simplified interface.

<I-COM>

This parameter represents the serial port that will be used to communicate with the wireless transmission channel driver. This is a virtual port, provided by Microsoft's Infrared Driver (see installation notes). The default setting is COM4. This parameter may be omitted if the demo is run in simulation mode.

Example: COM4.

<V-COM>

This parameter represents the serial port that will be used to communicate with the vending machine. If no vending machine is attached, this parameter should be omitted.

Example: COM2.

<-offline>

This switch runs the demo without performing live transactions with Qpass. This allows you to show the prototype without an Internet connection and/or Qpass account.

<-controller>

This switch runs the demo without a graphical user interface. This allows old and slow machines to act as a pure vending machine controller without showing graphical details and video sequences.

<-simulation>

This switch runs the demo as a pure simulation without the need for a mobile phone or wireless transmission channel adapter. However, a real live transaction (drink chosen by random) with Qpass will take place, unless this switch is combined with the <-offline> switch.

<-memberid:>

This switch overrides the Qpass Membership ID retrieved from the mobile phone (serial number of the handset) with the membership ID specified. It therefore allows transactions to be re-routed to a specific Qpass account. This is useful if you do not have a Qpass account set up for your specific mobile phone.

Example: -memberid:Mobile Service Link.

Note: the default Mobile Service Link Qpass account that may be used with any mobile phone has Membership ID Mobile Service Link and password Mobile Service Link.

<-password:>

This switch overrides the Qpass Password entered on the mobile phone (punched in by the user) with the specified password. It therefore allows transactions to be re-routed to a specific Qpass account. This is useful if you do not have a Qpass account set up for your specific mobile phone.

Example: -password:Mobile Service Link.

Note: the default Mobile Service Link Qpass account that may be used with any mobile phone has Membership ID Mobile Service Link and password Mobile Service Link.

Simulation View

The upper left-hand corner shows dynamic video sequences dependent on what the presenter does on the real phone. This is to show groups of people what is happening on the phone's display, without having to gather everybody around the phone itself.

Selected Product

In the upper middle part of the screenshot, you can see which drink has been chosen. As soon as the user selects a product, the specific drink is highlighted with a yellow blinking border.

Execution Log

The upper right-hand corner displays detailed plain text execution information. A history of the 100 most recent messages is kept, so that you can scroll up and down to see previous messages.

Architecture View

The main part of the window illustrates the prototype architecture and highlights the entities that are active at each point in time with a yellow blinking border.

Presenting the Demo

It is mentioned that in a fully configured system, the laptop would be a tiny and comparatively cheap PC component integrated directly into the vending machine.

The desk on which the PC's IrDA port is mounted in the exemplary demonstration described above is supposed to be the vending machine and that the IrDA port would usually be integrated into the front side of the machine. The phone and the IrDA port would be on it.

At the start of the example, the accessory menu is empty before you start.

The vending machine then proceeds to scan for phones in range, so as you walk into range holding the phone so that its IrDA port points to the PC's IrDA port a detection should be made. Once the connection is established, Go to the Extras menu of the phone and select the Accessories submenu. You can navigate using the phone's arrow- and yes/no-keys. You will see another submenu called Mobile Service Link. Select this one as well. You will be prompted for your Qpass PIN code to log on. There is no need to type the Qpass Membership ID. since you can use the phone's globally unique serial number that is read directly from the handset. This is an advantage since you want to avoid all unnecessary typing on the phone.

The Membership ID and the PIN code are now sent to the Qpass server to authenticate the user. What you entered can be seen in the Execution Log.

If the authentication failed, you return to the log-in page for a second try. This time you type in the correct PIN code. When the second attempt at authentication has been successfully completed the drinks list will be displayed. Select an item from the list by using the arrow-keys. Confirm your selection with yes.

A message will ask you to confirm the purchase and display the price of the beverage. Again press yes.

The transaction has now been transmitted to the Qpass Service Centre and is being processed. The Qpass Service Centre will confirm or refuse it depending on your credit limit. Once the transaction has been completed the user could go directly to the personalised Qpass member web site and see that the purchase has been registered.

After the transaction has succeeded, the can of drink will be released. Note: you may walk out of IrDA range with the phone and temporarily lose the connection. This is no problem, unless you do not get back within 60 seconds. Be sure the connection is re-established before you continue (beeps indicating the loss of connection should stop).

The phone will now ask you if you'd like to purchase another drink. Press yes and the user returns directly to the drinks list instead of to the log-on screen. Next time you are prompted to conduct another purchase answer no. The phone will then display a final "Thank you" message for using the Qpass service. Note that this message, just like all the others that were displayed throughout the demo, could well also be used for dynamic advertising, since it is being generated on the PC side.

If the demo was run with live transaction processing enabled, open up the Internet Explorer Web browser, which should be configured to directly bring up the Qpass member homepage associated with your phone.

Log on (Membership ID and password should be stored) and go to Statements and then Current Statement. The purchases have actually been registered.

Note: it may take 1-2 minutes from the transaction to the moment where the purchase is listed on the web page.

This exemplary Mobile Service Link discussion describes how the invention performs the follows actions:

Hijacking the Phone

The Mobile Service Link (WUMPI) invention is not just another one of "dial-a-drink" mechanism. The vending machine has been chosen because it is a very visual example of the inventions ability for products taking control of mobile phones (as the one wireless universal mobile device that everybody has these days) as their interface to offer services as users walk within range.

For example, you could also imagine using the phone to unlock your car or to modify printer settings on a laser printer without any buttons.

Micropayments to the Real World

Another difference in this invention is the use of a micropayment solution instead of charging the purchase to your phone bill. Until today, all micropayment systems, without exception, were only designed to conduct purchases for digital goods such as information, news and music.

Applicants invention, for the first time, demonstrates a possible extension of these systems to a complete marketplace, including physical goods and services.

Bypass the Network Operators

Although the Mobile Service Link concept of applicants' invention uses a mobile phone, the architecture completely bypasses the wireless network. No calls are made, no SMSs sent, no costs show up on the user's phone bill. The great advantage of using the mobile phone is that almost everybody has one, and even more importantly: everybody knows how to use it.

Ease-of-Use

Compared to other "dial-a-drink" systems, the Mobile Service Link of applicants' invention has a user interface is very user-friendly. There is no need to type or dial a long phone number, the transaction is quick and it doesn't create additional costs. As soon as the user feels thirsty and looks at the phone's display, the drinks list is already there.

The following provides an exemplary embodiment of the current WUMPI phone control technology which makes use of an Erickson R320s mobile device with IR port, a PC with an IR attachment connected to the vending device, and a JAVA application on the PC which talks via the PC's IR port to the IR port on the mobile device, whereby the user can choose an item displayed on the phone's menu by using the buttons on the phone. Those skilled in these arts will recognize many ways to program the various modules to interact with one another, and therefore we only below an exemplary embodiment of the Main module, the Phone module and the Vending Machine module, and these modules may be implemented in many ways as those skilled in these arts will recognize.

The menu for example might look like the following:

Coke, 1.50
Classic Coke, 1.50
Diet Coke, 1.50
Crystal Coke, 1.50
Sprite, 1.50
Fanta, 1.50
Orangina, 1.50
Perrier, 2.00
Ice Tea, 2.00
Mountain Dew, 1.50
Dr. Pepper, 1.50

It will be obvious to those skilled in these arts that this WUMPI logic can be applied to any Bluetooth enabled vendor device such as supermarkets, stores, taxis, parking meters, concert box-office. For example, jumping on a train, and paying for the trip on your telephone bill at the end of the month; paying for a taxi, concert tickets, your parking meter, or playing videos, music or Net games on your Palm Pilot or other PDA between classes, debiting your prepaid account.

Mobile devices such as GSM phones or PDAs, micropayment solutions, as they are known today from the Internet, can be ported to the real world using devices such as applicants invention described herein. In addition, a wide range of value-added services can be delivered directly to the point of sale. The main concepts shown here are the dynamic lookup of services, the extension of user interfaces to a mobile phone and the porting of Internet micropayments to the real world.

Having described the invention in terms of a preferred embodiment, it will be recognized by those skilled in the art that various types of general purpose computer hardware may be substituted for the configuration described above to achieve an equivalent result. Similarly, it will be appreciated that arithmetic logic circuits are configured to perform each required means in the claims. It will be apparent to those skilled in the art that modifications and variations of the preferred embodiment are possible, such as different mobile telephony systems may be used, different communications media such as different wireless communications protocols, as well as different types of mobile devices may be used by users, all of which fall within the true spirit and scope of the invention as measured by the following claims.

We claim:

1. Computer readable media having stored thereon first and second computer-executable instructions, wherein the first computer-executable instructions, when executed, cause a processor of a vending device to:

recognize a mobile device within communications range of a vendor device; and transmit a third code mechanism to the wireless mobile device, wherein the third code mechanism takes control of the wireless mobile device's menuing, interaction and display functions;

wherein the second computer-executable instructions, when executed cause a processor of a mobile device to:

control receiver hardware of the mobile device that is configured to wirelessly receive information to scan for a wireless communication signal from the vending device to thereby detect when the mobile device is within a wireless transmission range of the vending device, the vending device comprising a display interface including a listing of products available for purchase through the vending device;

in response to the detection of the mobile device being within the wireless transmission range, control the receiver of the mobile device to receive from a wireless network interface of the vending device, instructions to modify a menu system of the mobile device to thereby extend options for accessing vendor device services via the mobile device;

in response to receiving the instructions, control display hardware of the mobile device to generate, the modified menu system on the display of the mobile device, the modified menu system including the listing of products available for purchase;

control user interface hardware of the mobile device to receive a user inputted selection of a menu item of the menu system for selecting at least one of the products available for purchase; and in response to the user inputted selection, control transmission hardware of the mobile device that is configured to wirelessly transmit information that defines a purchase request from the mobile device to the wireless network of the vending device, the purchase request identifying the selected at least one of the products available for purchase.

2. The computer readable medium of claim 1, wherein the computer-executable instructions, when executed, further cause the processor of the mobile device to transmit the purchase request from the mobile device to the vending device by transmitting the purchase request through a remote server.

3. The computer readable medium of claim 1, wherein the computer-executable instructions, when executed, further cause the processor of the mobile device to transmit the purchase request from the mobile device directly to the vending device via a local wireless transmission.

4. The computer readable medium of claim 1, wherein the computer readable instructions, when executed, further cause the processor to interact wirelessly with a related payment accounting system to transmit user payment information from the mobile device to the related payment accounting system.

5. The computer readable medium of claim 4, further wherein the interaction with the related payment accounting system will cause the vendor device to provide a product corresponding to the user inputted selection of at least one of the products available for purchase.

6. The computer readable medium of claim 4, further wherein the interaction with the related payment accounting system will cause the vendor device to provide a service corresponding to the user inputted selection of at least one of the products available for purchase.

7. The computer readable medium of claim 4, further wherein the payment information comprises a debit amount to be charged to a user financial account at month end, and the debit amount is aggregated with other debit amounts charged through other interactions with the related payment accounting system.

8. The computer readable medium of claim 1, wherein the computer-executable instructions, when executed, further cause the processor to establish a temporary internet connection through the vending device's internet connection.

9. A system comprising:
a computer having a processor, a memory, connections to the Internet and a wireless transmission channel port;
a vendor device electronically coupled to the computer;
a logic mechanism coupled to computer whereby the vendor device is configured to transmit via the wireless transmission channel port to a compatible wireless transmission channel port on a mobile device, a program to take control of the wireless mobile device's menuing, interaction and display functions
a mobile device that includes a processor and a memory coupled to processor, the memory storing instructions executable by the processor to:
control receiver hardware of the mobile device that is configured to wirelessly receive information to scan for a wireless communication signal from the vending device to thereby detect when the mobile device has entered a local wireless transmission range of the vending device, the vending device comprising a display interface including a listing of products available for purchase through the vending device;
in response to the detection of the mobile device having entered the local wireless transmission range, control the receiver of the mobile device to receive from a wireless transmission of the vending device, the wireless transmission comprising:
a listing of products available for purchase through the vending device; and
instructions executable by the processor to control display hardware of the mobile device to thereby extend a display interface of the vending device to the mobile device to present the listing of products to a user via a display of the mobile device;
control user interface hardware of the mobile device to receive a user inputted selection of at least one of the products available for purchase; and
in response to the user inputted selection, control transmission hardware of the mobile device that is configured to wirelessly transmit information that defines a purchase request from the mobile device to a wireless network interface of the vending device, the purchase request comprising an identification of the selected at least one of the products available for purchase.

10. The mobile device of claim 9, wherein the instructions are further executable by the processor of the mobile device to transmit the purchase request from the mobile device to the vending device by transmitting the purchase request through a remote server.

11. The mobile device of claim 9, wherein the instructions are further executable by the processor of the mobile device to transmit the purchase request from the mobile device directly to the vending device via a local wireless transmission.

12. The mobile device of claim 9, wherein the instructions are further executable by the processor of the mobile device to interact wirelessly with a related payment accounting system to transmit user payment information from the mobile device to the related payment accounting system.

13. The mobile device of claim 12, wherein the interaction with the related payment accounting system will cause the vendor device to provide a product or service corresponding to the user inputted selection of at least one of the products available for purchase.

14. The mobile device of claim 9, wherein the instructions are further executable by the processor of the mobile device to establish a temporary internet connection through the vending device's internet connection.

15. A method comprising:
providing a vendor device with a computer platform coupled to a wireless transmission channel port;
transmitting from the vendor device via the wireless transmission channel port to a compatible wireless transmission channel port on a mobile device a program to take control of the wireless mobile device's menuing, interaction and display functions;
detecting, via a receiver hardware of the mobile device, when the mobile device has entered into a local wireless transmission range of the vending device, the vending device comprising a display interface including a listing of products available for purchase through the vending device, wherein the receiver hardware is configured to scan for a wireless communication signal from a vending device;
in response to a detection that the mobile device has entered into the local wireless transmission range, transmitting computer executable instructions to the mobile device that, when executed by the processor of the mobile device, cause the processor to control display hardware of the mobile device to thereby extend the display interface of the vending device to a display interface of the mobile device to present the listing of products available for purchase to a user via the mobile device;
receiving, by user interface hardware of the mobile device, a user inputted selection of at least one of the products available for purchase;
in response to the user inputted selection, transmitting via a wireless network interface a purchase request from the mobile device to the vending device, the purchase request comprising:
an identification of the selected at least one of the products available for purchase; and
user payment information to complete purchase of the at least one of the products available for purchase.

16. The method of claim 15, wherein transmitting the purchase request from the mobile device to the vending device comprises wirelessly routing the purchase request through a remote server.

17. The method of claim 15, wherein transmitting the purchase request comprises transmitting the purchase request from the mobile device directly to the vending device via a local wireless connection.

18. The method of claim 15, further comprising wirelessly routing the purchase request from the mobile device through a remote server of a payment accounting system that will process the purchase request to apply a debit charge to a user financial account and that will, upon completion of processing the purchase request, transmit instructions to the vending device to dispense a product to the user.

19. The method of claim 15, further comprising establishing a temporary internet connection through the vending device's internet connection.

20. The method of claim 15, wherein the listing of products available for purchase comprises a listing of products that are dispensable from the vending device.

* * * * *